US011878307B2

(12) United States Patent
Kurata et al.

(10) Patent No.: US 11,878,307 B2
(45) Date of Patent: Jan. 23, 2024

(54) COARSE CRUSHING DEVICE AND FIBER TREATMENT APPARATUS

(71) Applicant: SEIKO EPSON CORPORATION, Tokyo (JP)

(72) Inventors: Hiroki Kurata, Nagano (JP); Naotaka Higuchi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 17/104,036

(22) Filed: Nov. 25, 2020

(65) Prior Publication Data

US 2021/0154679 A1 May 27, 2021

(30) Foreign Application Priority Data

Nov. 27, 2019 (JP) ................................ 2019-214127
Nov. 27, 2019 (JP) ................................ 2019-214128

(51) Int. Cl.
*B02C 18/22* (2006.01)
*B02C 18/18* (2006.01)
(Continued)

(52) U.S. Cl.
CPC .......... *B02C 18/2283* (2013.01); *B02C 18/18* (2013.01); *B02C 18/28* (2013.01); *B02C 23/18* (2013.01); *D21B 1/26* (2013.01)

(58) Field of Classification Search
CPC ..... B02C 18/0007; B02C 18/28; B02C 18/08; B02C 18/083
See application file for complete search history.

(56) References Cited

U.S. PATENT DOCUMENTS 3,921,920 A * 11/1975 Brocard .............. B02C 18/0007 241/236
4,381,107 A * 4/1983 Armiger ................ B65H 35/02 270/52.09

(Continued)

FOREIGN PATENT DOCUMENTS

DE 19726033 A1 * 12/1998 ......... B02C 18/0007
JP S59-016552 A 1/1984

(Continued)

*Primary Examiner* — Katrina M Stransky
*Assistant Examiner* — P Derek Pressley
(74) *Attorney, Agent, or Firm* — Global IP Counselors, LLP

(57) ABSTRACT

A coarse crushing device including a rotary cutter portion tearing off a fiber-containing sheet in a first direction, a roller portion pinching the fiber-containing sheet, and a tearing portion provided between the rotary cutter portion and the roller portion, and having a plurality of blades tearing off the fiber-containing sheet in a second direction intersecting the first direction, in which the rotary cutter portion includes a first rotating shaft member rotating about a first axis, a second rotating shaft member rotating reversely to the first rotating shaft member about a second axis parallel to the first axis, a plurality of first rotary cutters provided on the first rotating shaft member and rotating together with the first rotating shaft member, and a plurality of second rotary cutters provided on the second rotating shaft member and rotating together with the second rotating shaft member, and the first rotary cutter and the second rotary cutter are separated from each other.

15 Claims, 19 Drawing Sheets

(51) Int. Cl.

| | |
|---|---|
| ***D21B 1/26*** | (2006.01) |
| ***B02C 18/28*** | (2006.01) |
| ***B02C 23/18*** | (2006.01) |

(56) References Cited

U.S. PATENT DOCUMENTS

| | | | | |
|---|---|---|---|---|
| 4,690,340 | A | 9/1987 | Hatanaka | |
| 4,776,525 | A | 10/1988 | Hatanaka | |
| 4,844,366 | A | 7/1989 | Hatanaka | |
| 2016/0199847 | A1 * | 7/2016 | Murayama | B02C 23/02<br>271/18 |
| 2016/0339442 | A1 | 11/2016 | Fujimori | |
| 2017/0100721 | A1 | 4/2017 | Fujimori | |

FOREIGN PATENT DOCUMENTS

| | | | | |
|---|---|---|---|---|
| JP | S60-168552 | A | | 9/1985 |
| JP | H05-007790 | A | | 1/1993 |
| JP | H05-177609 | A | | 7/1993 |
| JP | 2696008 | B2 | | 1/1998 |
| JP | 2017-70926 | A1 | * | 10/2015 |
| JP | 2016-215158 | A | | 12/2016 |
| JP | 2017-70926 | A | * | 4/2017 |
| JP | 2017-070926 | A | | 4/2017 |
| WO | 2017/150185 | A1 | | 9/2017 |

* cited by examiner

FIG. 10

| | INFORMATION READABILITY | FIBER LENGTH |
|---|---|---|
| EXAMPLE 1 | B | A |
| EXAMPLE 2 | A | A |
| COMPARATIVE EXAMPLE 1 | B | B |

FIG. 19

| | DISTANCE D1, D2 [mm] | DISTANCE D3 [mm] | BLADE WIDTH W1 [mm] | RATIO T1/T2 [%] | LIQUID L | | | INFORMATION READABILITY | FIBER LENGTH |
|---|---|---|---|---|---|---|---|---|---|
| | | | | | WATER | MOISTURIZING AGENT | SURFACE TENSION REGULATING AGENT | | |
| EXAMPLE 3 | 6 | 26 | 2.0 | 40 | 79 | 20 | 1 | A | A |
| EXAMPLE 4 | 6 | 26 | 2.0 | 40 | 100 | 0 | 0 | A | A |
| EXAMPLE 5 | 6 | 26 | 2.0 | 40 | 80 | 20 | 0 | A | A |
| EXAMPLE 6 | 6 | 26 | 2.0 | 40 | 99 | 0 | 1 | A | A |
| EXAMPLE 7 | 6 | 26 | 2.0 | 6 | 79 | 20 | 1 | A | B |
| EXAMPLE 8 | 6 | 26 | 2.0 | 80 | 79 | 20 | 1 | A | A |
| EXAMPLE 9 | 6 | 26 | 0.5 | 40 | 79 | 20 | 1 | A | B |
| EXAMPLE 10 | 6 | 26 | 2.5 | 40 | 79 | 20 | 1 | A | B |
| EXAMPLE 11 | 7 | 26 | 2.0 | 40 | 79 | 20 | 1 | B | A |
| EXAMPLE 12 | 6 | 27 | 2.0 | 40 | 79 | 20 | 1 | B | A |
| EXAMPLE 13 | 6 | 26 | 2.0 | 5 | 79 | 20 | 1 | A | C |
| EXAMPLE 14 | 6 | 26 | 2.0 | 81 | 79 | 20 | 1 | B | A |
| EXAMPLE 15 | 6 | 26 | 0.4 | 40 | 79 | 20 | 1 | A | C |
| EXAMPLE 16 | 6 | 26 | 2.6 | 40 | 79 | 20 | 1 | B | C |
| COMPARATIVE EXAMPLE 2 | 6 | 26 | 2.0 | 0 | - | - | - | A | D |

COARSE CRUSHING DEVICE AND FIBER TREATMENT APPARATUS

The present application is based on, and claims priority from JP Application Serial Number 2019-214127, filed Nov. 27, 2019 and JP Application Serial Number 2019-214128, filed Nov. 27, 2019, the disclosures of which are hereby incorporated by reference herein in their entirety.

BACKGROUND

1. Technical Field

The present disclosure relates to a coarse crushing device and a fiber treatment apparatus.

2. Related Art

Paper, which is mainly used as a printing medium, is being reused worldwide from the viewpoint of environmental problems such as deforestation and $CO_2$ emission associated with paper manufacturing.

As a method of treating a waste paper, normally, the waste paper on which confidential contents are written is cut with a shredder so that the contents cannot be read, and then the paper is recycled. However, when the waste paper is cut with a shredder, the fibers of the paper are shorter and the strength of the recycled paper decreases. When the strength of the recycled paper is low, it is difficult to handle as the paper, such as tearing easily from the binding holes, bending when held by hand, and inability of passing through when printing with a printer.

For example, JP-A-5-7790 describes a rotary coarse crushing device that supports a plurality of coarse crushing shafts provided with rotary blades with blades formed over an entire circumference of an outer peripheral surface fixed to a rotating shaft at regular intervals so as to be rotationally driven, in a state where the rotary blades of the other coarse crushing shaft are located between the rotary blades of one coarse crushing shaft and the rotating shafts are parallel to each other so that a gap is formed between both of the rotary blades.

In the coarse crushing device of JP-A-5-7790, it is possible to shred the waste paper in a sheet passing direction, and the waste paper may not be shredded in a direction intersecting the sheet passing direction. Therefore, it may not be possible to erase confidential contents. In addition, when the waste paper is shredded, a shearing force is applied to the fibers and the fibers are cut into short pieces. Therefore, when a recycled paper is manufactured using the fibers as a raw material, the strength of the recycled paper may decrease. When the strength of the recycled paper is low, it is difficult to handle as the paper, such as tearing easily from the binding holes, bending when held by hand, and inability of passing through when printing with a printer.

SUMMARY

According to an aspect of the present disclosure, there is provided a coarse crushing device including a rotary cutter portion tearing off a fiber-containing sheet in a first direction, a roller portion pinching the fiber-containing sheet, and a tearing portion provided between the rotary cutter portion and the roller portion, and having a plurality of blades tearing off the fiber-containing sheet in a second direction intersecting the first direction, in which the rotary cutter portion includes a first rotating shaft member rotating about a first axis, a second rotating shaft member rotating reversely to the first rotating shaft member about a second axis parallel to the first axis, a plurality of first rotary cutters provided on the first rotating shaft member and rotating together with the first rotating shaft member, and a plurality of second rotary cutters provided on the second rotating shaft member and rotating together with the second rotating shaft member, the second rotary cutter is located between the first rotary cutters adjacent to each other, the first rotary cutter is located between the second rotary cutters adjacent to each other, the first rotary cutter and the second rotary cutter are separated from each other, and the roller portion includes a first roller and a second roller rotating in directions opposite to each other.

In the device, the first roller may rotate about a third axis parallel to the first axis, the second roller may rotate about a fourth axis parallel to the first axis, and the blade of the tearing portion may cross a virtual straight line coupling a middle between the first axis and the second axis and a middle between the third axis and the fourth axis, when tearing off the fiber-containing sheet in the second direction.

In the device, the tearing portion may tear off the fiber-containing sheet when the fiber-containing sheet is pinched by the roller portion.

In the device, the roller portion may pinch the fiber-containing sheet passed through the rotary cutter portion, and rotation speeds of the first roller and the second roller may be higher than rotation speeds of the first rotary cutter and the second rotary cutter.

In the device, the rotary cutter portion may tear off the fiber-containing sheet passed through the roller portion, and rotation speeds of the first rotary cutter and the second rotary cutter may be higher than rotation speeds of the first roller and the second roller.

In the device, the tearing portion may include a roller provided with the blade on an outer surface thereof.

In the device, a plurality of the blades may be provided in a spiral shape.

In the device, a tip end of the blade may be bent in a rotation direction of the roller of the tearing portion.

In the device, the tearing portion may include a plate-shaped member provided with the blade on one side, the first roller may rotate about a third axis parallel to the first axis, the second roller may rotate about a fourth axis parallel to the first axis, and a distance between a virtual straight line coupling a middle between the first axis and the second axis and a middle between the third axis and the fourth axis and a tip end of the blade may be 0.5 mm or more and 5 mm or less.

In the device, a distance between the first rotary cutters adjacent to each other may be 6 mm or less, a distance between the second rotary cutters adjacent to each other may be 6 mm or less, and a distance between the tearing portion and the roller portion may be 26 mm or less.

In addition, according to another aspect of the present disclosure, there is provided a coarse crushing device including a first rotating shaft member rotating about a first axis, a second rotating shaft member rotating reversely to the first rotating shaft member about a second axis parallel to the first axis, a plurality of first rotary cutters provided on the first rotating shaft member and rotating together with the first rotating shaft member, and a plurality of second rotary cutters provided on the second rotating shaft member and rotating together with the second rotating shaft member, a first liquid supply portion supplying a liquid to the first rotary cutter, in which the second rotary cutter is located between the first rotary cutters adjacent to each other, the first rotary cutter is located between the second rotary cutters adjacent to each other, and the first rotary cutter and the second rotary cutter are separated from each other.

In the device, the first rotary cutter and the second rotary cutter may form a rotary cutter portion tearing off a fiber-containing sheet in a first direction, the device further including a roller portion pinching the fiber-containing sheet, a tearing portion provided between the rotary cutter portion and the roller portion, and having a plurality of blades tearing off the fiber-containing sheet in a second direction intersecting the first direction, and a second liquid supply portion supplying a liquid to the blade, and the roller portion may include a first roller and a second roller rotating in directions opposite to each other.

In the device, the tearing portion may include a roller provided with the blade on an outer surface thereof.

In the device, a distance between the first rotary cutters adjacent to each other may be 6 mm or less, a distance between the second rotary cutters adjacent to each other may be 6 mm or less, and a distance between the tearing portion and the roller portion may be 26 mm or less.

In the device, the first liquid supply portion may include a roller in which the liquid is applied to an outer surface thereof.

In the device, a thickness of the liquid applied to the outer surface of the roller may be 6% or more and 80% or less with respect to a thickness of a fiber-containing sheet.

In the device, a blade width of the first rotary cutter may be 0.5 mm or more and 2.5 mm or less.

According to still another aspect of the present disclosure, there is provided a fiber treatment apparatus including the coarse crushing device.

BRIEF DESCRIPTION OF THE DRAWINGS

FIG. 10 is a table illustrating evaluation results.

FIG. 19 is a table illustrating evaluation results.

DESCRIPTION OF EXEMPLARY EMBODIMENTS

Hereinafter, preferred embodiments of the present disclosure will be described in detail with reference to the drawings. The embodiments described below do not unduly limit the contents of the present disclosure described in the aspects. In addition, not all of the configurations described below are essential configuration requirements of the present disclosure.

1. First Embodiment

1. 1. Coarse Crushing Device

1. 1. 1. Configuration

Figure 1:
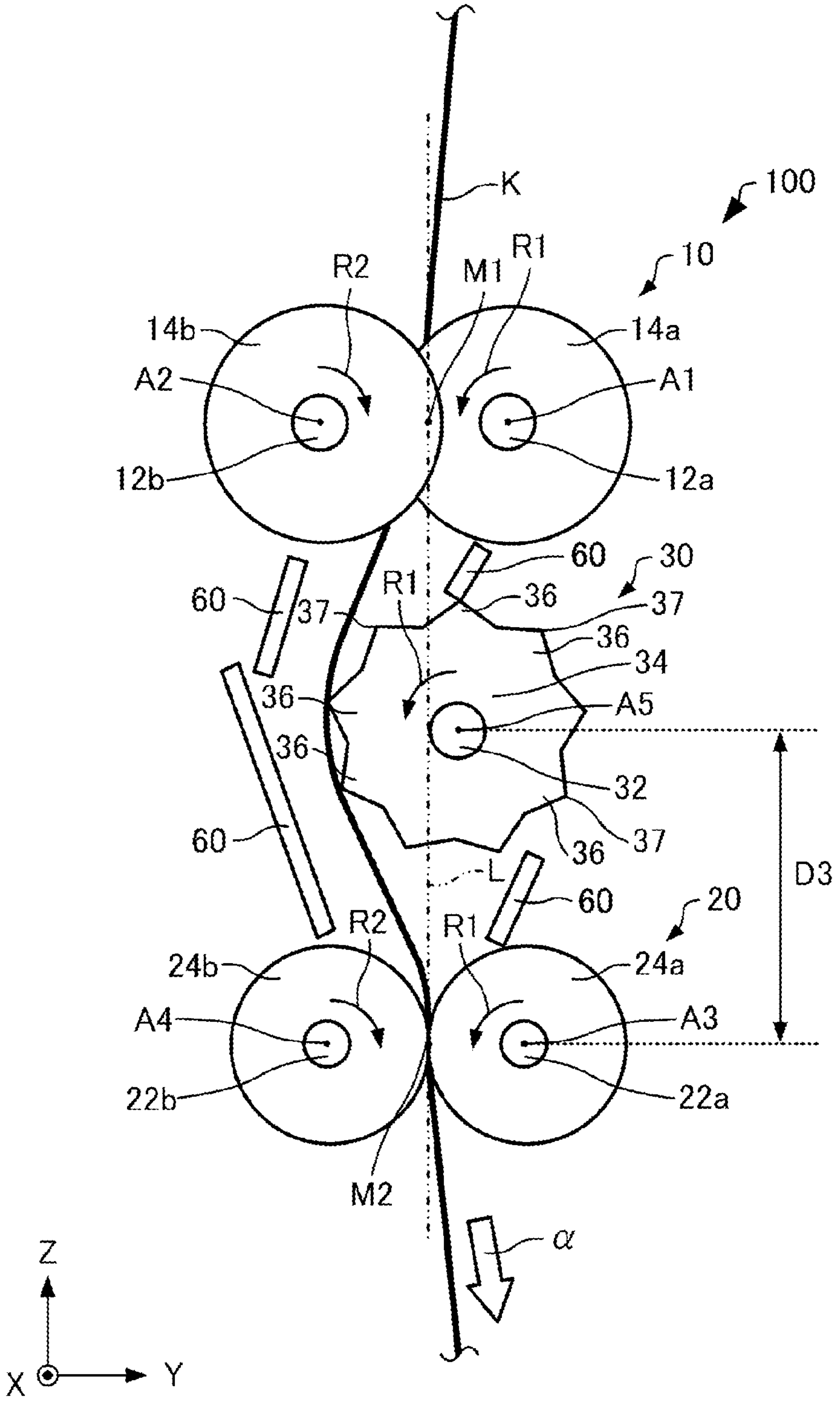
FIG. 1 is a side view schematically illustrating a coarse crushing device according to a first embodiment.
Figure 2:
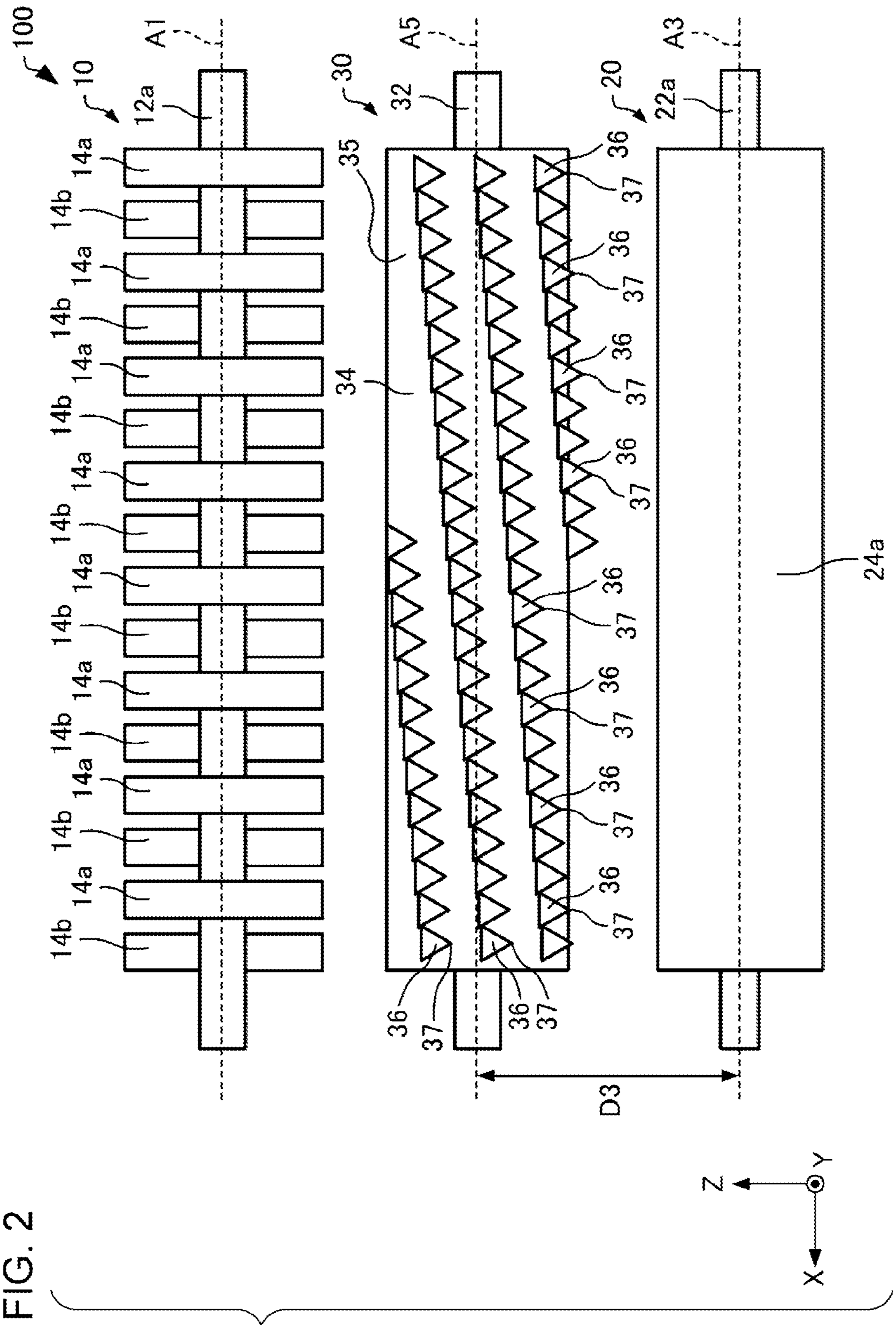
FIG. 2 is a front view schematically illustrating the coarse crushing device according to the first embodiment.

First, a coarse crushing device according to a first embodiment will be described with reference to the drawings. FIG. 1 is a side view schematically illustrating a coarse crushing device 100 according to the first embodiment. FIG. 2 is a front view schematically illustrating the coarse crushing device 100 according to the first embodiment. In FIGS. 1 and 2, an X axis, a Y axis, and a Z axis are illustrated as three axes orthogonal to each other.

As illustrated in FIGS. 1 and 2, the coarse crushing device 100 includes a rotary cutter portion 10, a roller portion 20, and a tearing portion 30. Furthermore, the coarse crushing device 100 includes a housing (not illustrated). The housing accommodates the rotary cutter portion 10, the roller portion 20, and the tearing portion 30. The housing is provided with a charging port for charging a fiber-containing sheet K to be crushed. The fiber-containing sheet K is a sheet containing fibers, and is, for example, a waste paper or a pulp sheet.

The rotary cutter portion 10 includes a first rotating shaft member **12*a*, a second rotating shaft member 12*b*, a first rotary cutter 14*a*, and a second rotary cutter 14*b*. Here, FIG. 3 is a plan view schematically illustrating the rotary cutter portion 10**.

Figure 3:
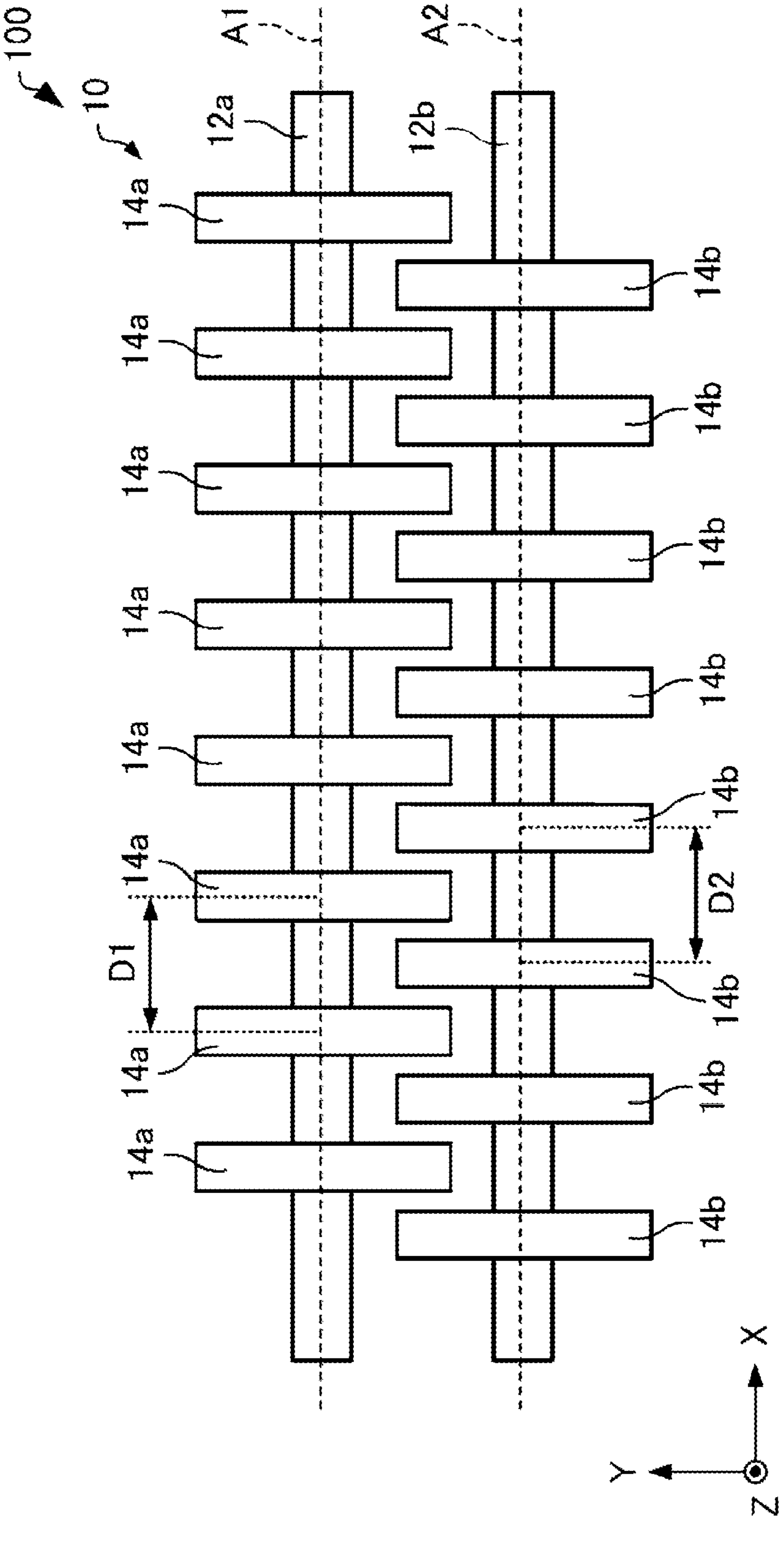
FIG. 3 is a plan view schematically illustrating a rotary cutter portion of the coarse crushing device according to the first embodiment.

The first rotating shaft member **12*a* rotates about a first axis A1 as illustrated in FIGS. 1 to 3. The second rotating shaft member 12*b* rotates reversely to the first rotating shaft member 12*a* about a second axis A2 parallel to the first axis A1. In the illustrated example, the first axis A1 and the second axis A2 are axes parallel to the X axis. The first rotating shaft member 12*a* is provided in the +Y axis direction of the second rotating shaft member 12*b*. The shape of the rotating shaft members 12*a* and 12*b* is, for example, a circle when viewed in the direction of the first axis A1. The first axis A1 direction is an extending direction of the first axis A1**, and is the X axis direction in the illustrated example.

The first rotary cutter **14*a* is provided on the first rotating shaft member 12*a*. A plurality of first rotary cutters 14*a* are provided. The first rotary cutter 14***a* is fixed to the first rotating shaft member 12*a*, and rotates in an R1 direction illustrated in FIG. 1 together with the first rotating shaft member 12*a*.

The plurality of first rotary cutters 14*a* are provided, for example, at equal intervals along the X axis. The second rotary cutter 14*b* is located between the first rotary cutters 14*a* adjacent to each other. The distance D1 between the first rotary cutters 14*a* adjacent to each other is, for example, 0.5 mm or more and 6 mm or less. Here, "distance between the first rotary cutters 14*a* adjacent to each other" means the distance between the center of one of the first rotary cutters 14*a* and the center of the other first rotary cutter 14*a* in the first rotary cutters 14*a* adjacent to each other. The same applies to the "distance between the second rotary cutters 14*b* adjacent to each other".

The second rotary cutter 14*b* is provided on the second rotating shaft member 12*b*. A plurality of second rotary cutters 14*b* are provided. The second rotary cutter 14*b* is fixed to the second rotating shaft member 12*b*, and rotates in an R2 direction illustrated in FIG. 1 together with the second rotating shaft member 12*b*.

The plurality of second rotary cutters 14*b* are provided, for example, at equal intervals along the X axis. The first rotary cutter 14*a* is located between the second rotary cutters 14*b* adjacent to each other. The distance D2 between the second rotary cutters 14*b* adjacent to each other is, for example, 0.5 mm or more and 6 mm or less. As illustrated in FIG. 1, a portion of the first rotary cutter 14*a* and a portion of the second rotary cutter 14*b* overlap each other when viewed in the X axis direction. As illustrated in FIG. 2, the first rotary cutter 14*a* and the second rotary cutter 14*b* are alternately disposed in the X axis direction when viewed in the Y axis direction. The first rotary cutter 14*a* and the second rotary cutter 14*b* are separated from each other. A gap is provided between the first rotary cutter 14*a* and the second rotary cutter 14*b* adjacent to each other.

The shape of the first rotary cutter 14*a* and the second rotary cutter 14*b* is, for example, a disk shape having a thickness in the X axis direction. The thickness (blade width) of the rotary cutters 14*a* and 14*b* is, for example, 0.5 mm or more and 2.5 mm or less. The shape of the first rotary cutter 14*a* and the shape of the second rotary cutter 14*b* are, for example, the same as each other. The material of the rotary cutters 14*a* and 14*b* is not particularly limited, and is metal, for example.

As illustrated in FIGS. 1 and 2, the roller portion 20 includes, for example, a third rotating shaft member 22*a*, a fourth rotating shaft member 22*b*, a first roller 24*a*, and a second roller 24*b*.

The third rotating shaft member 22*a* rotates about a third axis A3. The fourth rotating shaft member 22*b* rotates reversely to the third rotating shaft member 22*a* about a fourth axis A4. In the illustrated example, the third axis A3 and the fourth axis A4 are axes parallel to the X axis. The third rotating shaft member 22*a* is provided in the +Y axis direction of the fourth rotating shaft member 22*b*. The shape of the rotating shaft members 22*a* and 22*b* is, for example, a circle when viewed in the X axis direction.

The first roller 24*a* is provided on the third rotating shaft member 22*a*. The first roller 24*a* is fixed to the third rotating shaft member 22*a* and rotates about the third axis A3 together with the third rotating shaft member 22*a*. In the illustrated example, the first roller 24*a* rotates in the same R1 direction as the first rotary cutter 14*a*.

The second roller 24*b* is provided on the fourth rotating shaft member 22*b*. The second roller 24*b* is fixed to the fourth rotating shaft member 22*b* and rotates about the fourth axis A4 together with the fourth rotating shaft member 22*b*. In the illustrated example, the second roller 24*b* rotates in the same R2 direction as the second rotary cutter 14*b*. The first roller 24*a* and the second roller 24*b* rotate in the directions opposite to each other.

Rotation speeds of the first roller 24*a* and the second roller 24*b* are higher than rotation speeds of the first rotary cutter 14*a* and the second rotary cutter 14*b*. That is, rotation speeds of the third rotating shaft member 22*a* and the fourth rotating shaft member 22*b* are higher than rotation speeds of the first rotating shaft member 12*a* and the second rotating shaft member 12*b*. The rotation speed of the first roller 24*a* and the rotation speed of the second roller 24*b* are, for example, the same as each other. The rotation speed of the first rotary cutter 14*a* and the rotation speed of the second rotary cutter 14*b* are, for example, the same as each other.

The shape of the first roller 24*a* and the second roller 24*b* is, for example, a cylindrical shape. The material of the rollers 24*a* and 24*b* is not particularly limited, and is, for example, plastic or rubber.

The tearing portion 30 is provided between the rotary cutter portion 10 and the roller portion 20. The tearing portion 30 includes, for example, a fifth rotating shaft member 32, a third roller 34, and a blade 36.

The fifth rotating shaft member 32 rotates about a fifth axis A5. The fifth rotating shaft member 32 is located, for example, between the first rotary cutter 14*a* and the first roller 24*a*. In the illustrated example, the fifth axis A5 is an axis parallel to the X axis. The shape of the fifth rotating shaft member 32 is, for example, a circle when viewed in the X axis direction.

The third roller 34 is provided on the fifth rotating shaft member 32. The third roller 34 is fixed to the fifth rotating shaft member 32, and rotates about the fifth axis A5 together with the fifth rotating shaft member 32. In the illustrated example, the third roller 34 rotates in the same R1 direction as the first rotary cutter 14*a*. The rotation speed of the third roller 34 may be the same as the rotation speed of the rollers 24*a* and 24*b*, or may be higher than the rotation speeds of the rollers 24*a* and 24*b*. The shape of the third roller 34 is, for example, a cylindrical shape.

The blade 36 is provided on an outer surface 35 of the third roller 34. In the example illustrated in FIG. 1, a tip end 37 of the blade 36 is in contact with the fiber-containing sheet K. A plurality of blades 36 are provided. As illustrated in FIG. 2, the plurality of blades 36 are provided, for example, in a spiral shape about the fifth axis A5. As illustrated in FIG. 2, when viewed in the Y axis direction, for example, the plurality of blades 36 are arranged in a row inclined with respect to the X axis, and a plurality of rows are provided. The plurality of blades 36 are provided, for example, in a saw blade shape. The blade 36 may be provided integrally with the third roller 34. The material of the blade 36 and the third roller 34 is not particularly limited, and is, for example, metal.

The blade 36 is provided across a virtual straight line L, as illustrated in FIG. 1. In the illustrated example, the blade 36 is provided so as to intersect the virtual straight line L. The virtual straight line L is a straight line that couples a middle M1 between the first axis A1 and the second axis A2 and a middle M2 between the third axis A3 and the fourth axis A4.

A distance D3 between the tearing portion 30 and the roller portion 20 is, for example, 1 mm or more and 26 mm or less. Here, "distance between the tearing portion 30 and the roller portion 20" is a distance in the Z axis direction between the center of the tearing portion 30 and the center of the roller portion 20, and in the illustrated example, it is a distance in the Z axis direction between the third axis A3 and the fifth axis A5. The Z axis direction may be the vertical direction.

The coarse crushing device 100 may include a guide portion 60 that guides the fiber-containing sheet K from the rotary cutter portion 10 to the roller portion 20, as illustrated in FIG. 1. The shape and number of the guide portions 60 are not particularly limited. For the sake of convenience, the illustration of the guide portion 60 is omitted in FIG. 2.

1. 1. 2. Operation

When the fiber-containing sheet K is charged from a charging port (not illustrated) of the coarse crushing device 100, the fiber-containing sheet K enters the rotary cutter portion 10 as illustrated in FIG. 1. The first rotary cutter 14*a* and the second rotary cutter 14*b* of the rotary cutter portion 10 are separated from each other. Therefore, the rotary cutter portion 10 is not sharp, and the rotary cutter portion 10 tears off the fiber-containing sheet K in the first direction by the rotary cutters 14*a* and 14*b*. In the illustrated example, the first direction is the X axis direction. As a result, a fissure is formed in the fiber-containing sheet K along the Z axis direction.

Next, the fiber-containing sheet K comes into contact with the tearing portion 30 and enters the roller portion 20. The roller portion 20 pinches the fiber-containing sheet K passed through the rotary cutter portion 10 by the rollers 24*a* and 24*b*. The fiber-containing sheet K is pulled by being pinched by the roller portion 20 and is stretched between the rotary cutter portion 10 and the roller portion 20.

The blade 36 of the tearing portion 30 is in contact with the fiber-containing sheet K in a state where the fiber-containing sheet K is pulled. The blade 36 tears off the fiber-containing sheet K in the second direction intersecting the first direction when the fiber-containing sheet K is pinched by the roller portion 20. The second direction is, for example, the Z axis direction. As a result, a fissure is formed in the fiber-containing sheet K along the X axis direction, and the fiber-containing sheet K is a small piece. The blade 36 crosses the virtual straight line L when tearing off the fiber-containing sheet K in the second direction.

As described above, the coarse crushing device 100 tears off the fiber-containing sheet K into small pieces. The coarse crushing device 100 is a shredder that tears off the fiber-containing sheet K. The small piece has, for example, a shape having a longitudinal direction in a sheet passing direction α of the fiber-containing sheet K. The length of the small piece in the longitudinal direction is determined by the distance D3 between the tearing portion 30 and the roller portion 20. A length of the small piece in the lateral direction is determined by the distance D1 between the first rotary cutters 14*a* adjacent to each other and the distance D2 between the second rotary cutters 14*b* adjacent to each other.

1. 1. 3. Effect

The coarse crushing device 100 has the following effects, for example.

The coarse crushing device 100 includes the rotary cutter portion 10 that tears off the fiber-containing sheet K in the first direction, the roller portion 20 that pinches the fiber-containing sheet K, and the tearing portion 30 that is provided between the rotary cutter portion 10 and the roller portion 20 and has a plurality of blades 36 tearing off the fiber-containing sheet K in a second direction intersecting the first direction. As described above, in the coarse crushing device 100, the fiber-containing sheet K is torn off in the first direction and the second direction, so that the confidential contents can be erased while leaving the fibers long. By reusing such long fibers, a sheet having high paper strength can be formed.

In the coarse crushing device 100, the blade 36 of the tearing portion 30 crosses a virtual straight line L that couples the middle M1 between the first axis A1 and the second axis A2 and the middle M2 between the third axis A3 and the fourth axis A4, when tearing off the fiber-containing sheet K in the second direction. Therefore, the fiber-containing sheet K can be reliably torn off by the blade 36 in the coarse crushing device 100.

In the coarse crushing device 100, the roller portion 20 pinches the fiber-containing sheet K passed through the rotary cutter portion 10, and the rotation speeds of the first roller 24*a* and the second roller 24*b* is higher than the rotation speeds of the first rotary cutter 14*a* and the second rotary cutter 14*b*. Therefore, the roller portion 20 can pull the fiber-containing sheet K passed through the rotary cutter portion 10 in the coarse crushing device 100. The tearing portion 30 can tear off the fiber-containing sheet K in a state where the fiber-containing sheet K is pulled by the roller portion 20. Therefore, the tearing portion 30 can reliably tear off the fiber-containing sheet K as compared with the case where the fiber-containing sheet is not pulled.

In the coarse crushing device 100, the tearing portion 30 includes a third roller 34 having a blade 36 on the outer surface 35. Therefore, the tearing portion 30 can tear off the fiber-containing sheet K by rotating the third roller 34.

The plurality of blades 36 are provided in a spiral shape in the coarse crushing device 100. Therefore, the plurality of blades 36 come in contact with the fiber-containing sheet K with a time difference. As a result, the fiber-containing sheet K can be torn off with a small force as compared with the case where all of the plurality of blades 36 simultaneously come in contact with the fiber-containing sheet.

In the coarse crushing device 100, the distance D1 between the first rotary cutters 14*a* adjacent to each other is 6 mm or less, the distance D2 between the second rotary cutters 14*b* adjacent to each other is 6 mm or less, and the distance D3 between the tearing portion 30 and the roller portion 20 is 26 mm or less. Therefore, in the coarse crushing device 100, the fiber-containing sheet K can be made finer as compared with the case where the distance D1 is larger than 6 mm, the distance D2 is larger than 6 mm, and the distance D3 is larger than 26 mm.

1. 2. Modification Examples

1. 2. 1. First Modification Example

Figure 4:
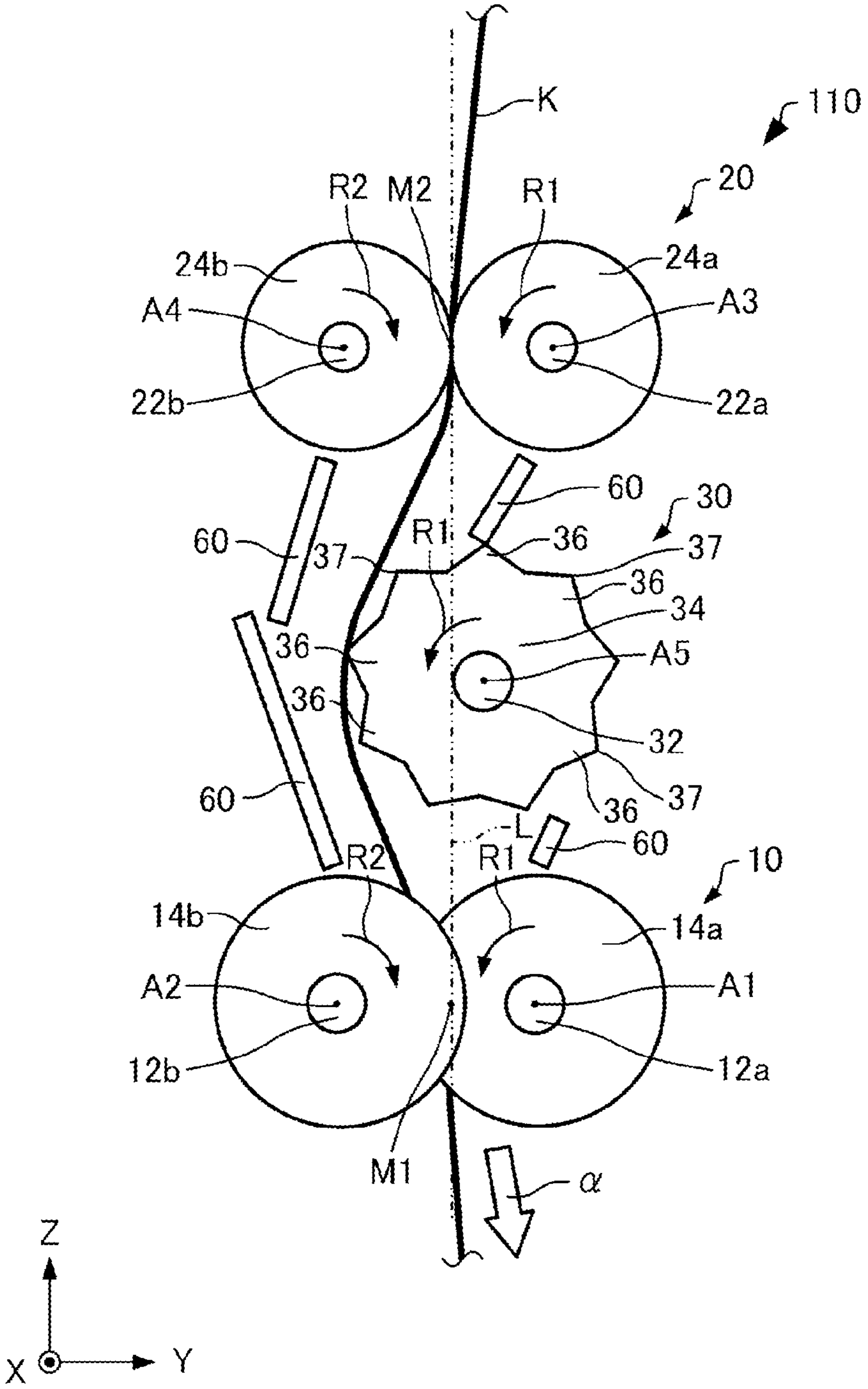
FIG. 4 is a side view schematically illustrating a coarse crushing device according to a first modification example of the first embodiment.

Next, a coarse crushing device according to a first modification example of the first embodiment will be described with reference to the drawings. FIG. 4 is a side view schematically illustrating a coarse crushing device 110 according to the first modification example of the first embodiment.

Hereinafter, in the coarse crushing device 110 according to the first modification example of the first embodiment, members having the same functions as those of the constituent members of the coarse crushing device 100 according to the first embodiment described above are denoted by the same reference numerals, and detailed description thereof will be omitted. This is the same in a coarse crushing device according to a second modification example of the first embodiment described later.

In the coarse crushing device 100 described above, as illustrated in FIG. 1, the roller portion 20 pinches the fiber-containing sheet K passed through the rotary cutter portion 10. That is, the fiber-containing sheet K is pinched by the roller portion 20 after passing through the rotary cutter portion 10.

On the other hand, in the coarse crushing device 110, as illustrated in FIG. 4, the rotary cutter portion 10 tears off the fiber-containing sheet K passed through the roller portion 20. That is, the fiber-containing sheet K is torn off by the rotary cutter portion 10 after passing through the roller portion 20.

In the coarse crushing device 110, the rotation speeds of the first rotary cutter 14*a* and the second rotary cutter 14*b* are higher than the rotation speeds of the first roller 24*a* and the second roller 24*b*. That is, the rotation speeds of the first rotating shaft member 12*a* and the second rotating shaft member 12*b* are higher than the rotation speeds of the third rotating shaft member 22*a* and the fourth rotating shaft member 22*b*. Therefore, in the coarse crushing device 110, the rotary cutter portion 10 can pull the fiber-containing sheet K passed through the roller portion 20. The tearing portion 30 can tear off the fiber-containing sheet K in a state where the fiber-containing sheet K is pulled by the rotary cutter portion 10.

1. 2. 2. Second Modification Example

Figure 5:
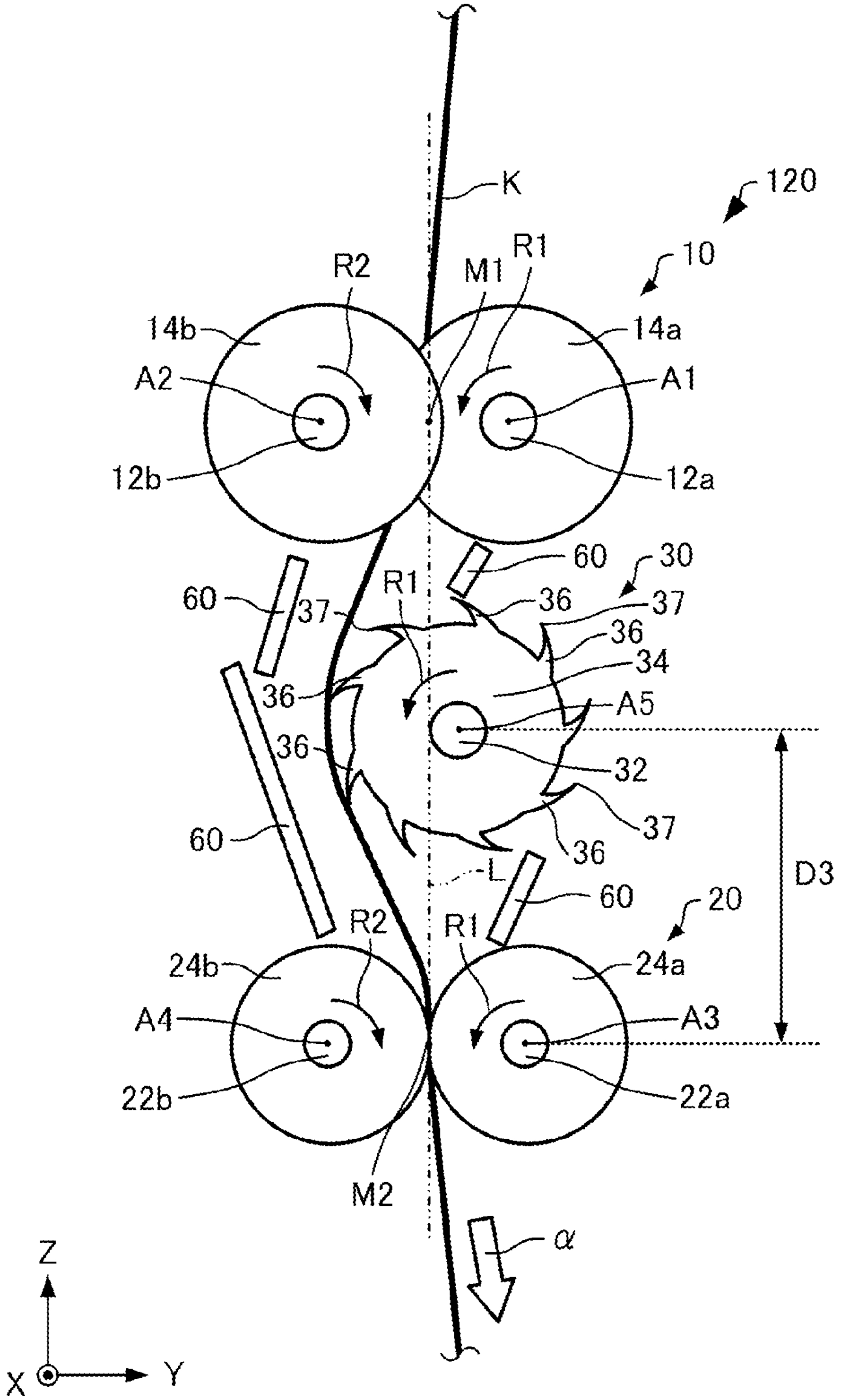
FIG. 5 is a side view schematically illustrating a coarse crushing device according to a second modification example of the first embodiment.

Next, a coarse crushing device according to a second modification example of the first embodiment will be described with reference to the drawings. FIG. 5 is a side view schematically illustrating a coarse crushing device 120 according to the second modification example of the first embodiment.

In the coarse crushing device 120, as illustrated in FIG. 5, the shape of the blade 36 of the tearing portion 30 is different from that of the above-described coarse crushing device 100. In the coarse crushing device 120, the tip end 37 of the blade 36 is bent in the rotation direction of the third roller 34. Therefore, the fiber-containing sheet K can be torn off by the tip end 37 of the blade 36. As a result, the fiber-containing sheet K can be torn off with a small force. The shape of the blade 36 is, for example, a claw shape that bends in the rotation direction of the third roller 34.

2. Second Embodiment

Figure 6:
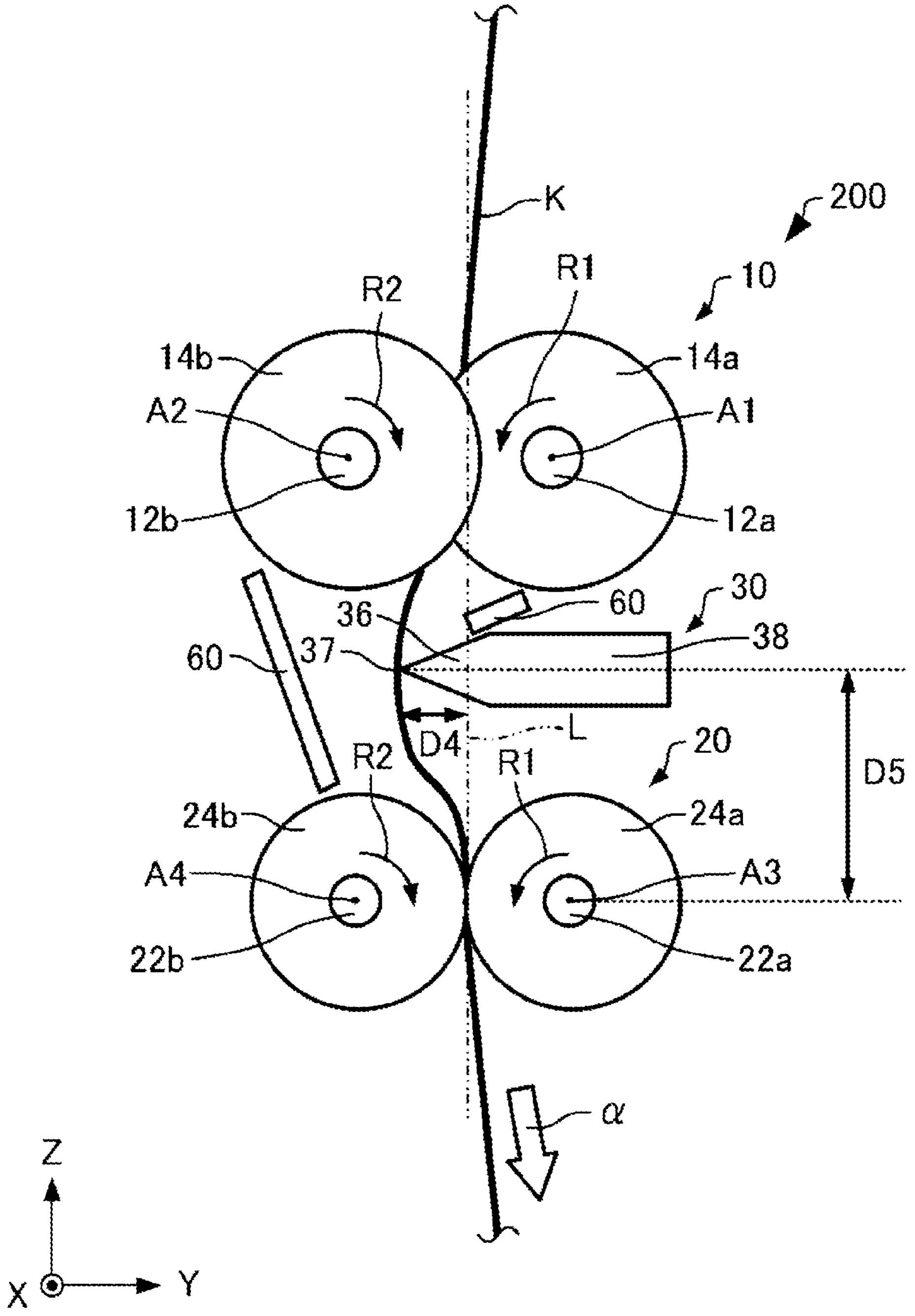
FIG. 6 is a side view schematically illustrating a coarse crushing device according to a second embodiment.
Figure 7:
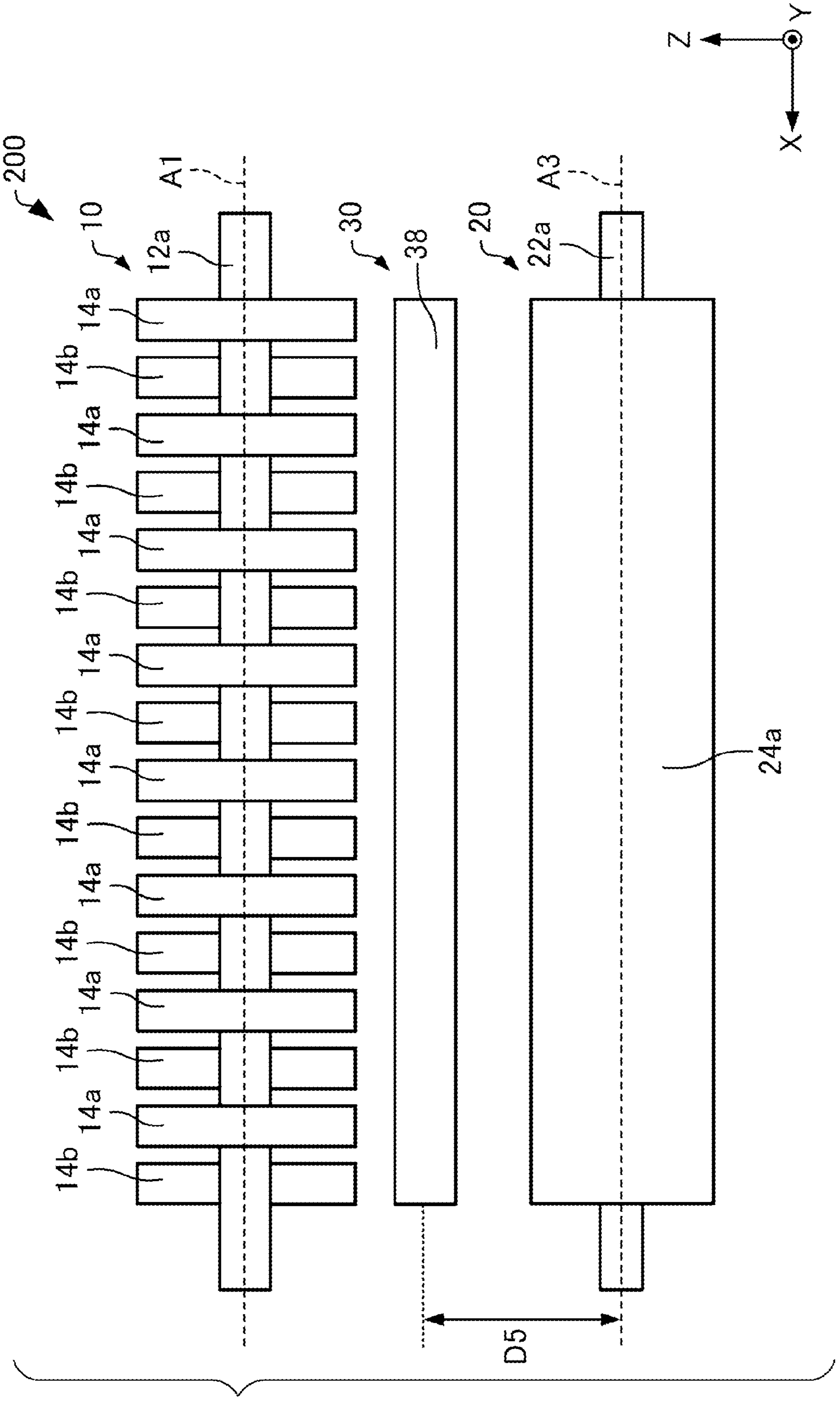
FIG. 7 is a front view schematically illustrating the coarse crushing device according to the second embodiment.
Figure 8:
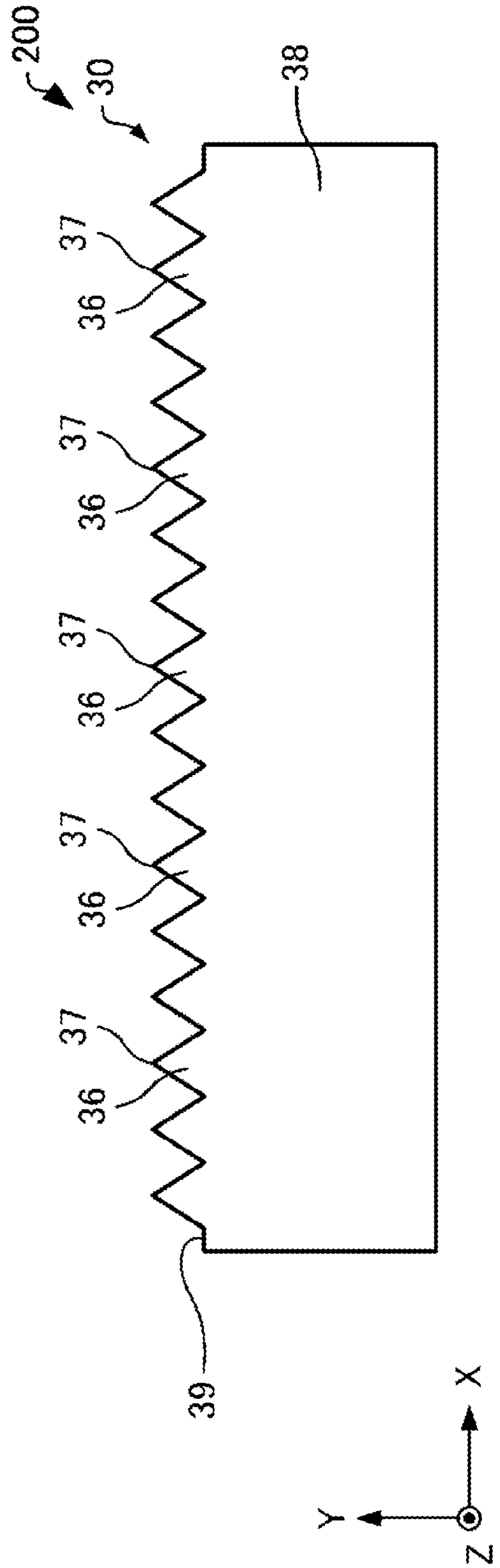
FIG. 8 is a plan view schematically illustrating a tearing portion of the coarse crushing device according to the second embodiment.

Next, a coarse crushing device according to a second embodiment will be described with reference to the drawings. FIG. 6 is a side view schematically illustrating a coarse crushing device 200 according to the second embodiment. FIG. 7 is a front view schematically illustrating the coarse crushing device 200 according to the second embodiment. FIG. 8 is a plan view schematically illustrating a tearing portion 30 of the coarse crushing device 200 according to the second embodiment.

Hereinafter, in the coarse crushing device 200 according to the second embodiment, members having the same functions as those of the constituent members of the coarse crushing device 100 according to the first embodiment described above are denoted by the same reference numerals, and detailed description thereof will be omitted.

In the above-described coarse crushing device 100, as illustrated in FIGS. 1 and 2, the tearing portion 30 includes the third roller 34 having the plurality of blades 36 on the outer surface 35.

On the other hand, in the coarse crushing device 200, as illustrated in FIGS. 6 to 8, the tearing portion 30 includes a plate-shaped member 38 having a plurality of blades 36 on one side. The plurality of blades 36 are provided on a side surface 39 of the plate-shaped member 38. In the illustrated example, the plurality of blades 36 are arranged in the X axis direction.

In the coarse crushing device 200, the distance D4 between the tip end 37 of the blade 36 and the virtual straight line L is, for example, 0.5 mm or more and 5 mm or less. When the distance D4 is 0.5 mm or more, the fiber-containing sheet K can be more reliably torn off by the blade 36. When the distance D4 is 5 mm or less, the fiber-containing sheet K can be more reliably transported to the roller portion 20. When the distance D4 is larger than 5 mm, the tearing portion may interfere and the fiber-containing sheet may not be transported to the roller portion.

The distance D5 in the Z axis direction between the tip end 37 of the blade 36 and the third axis A3 is, for example, 1 mm or more and 15 mm or less.

3. Third Embodiment

Figure 9:
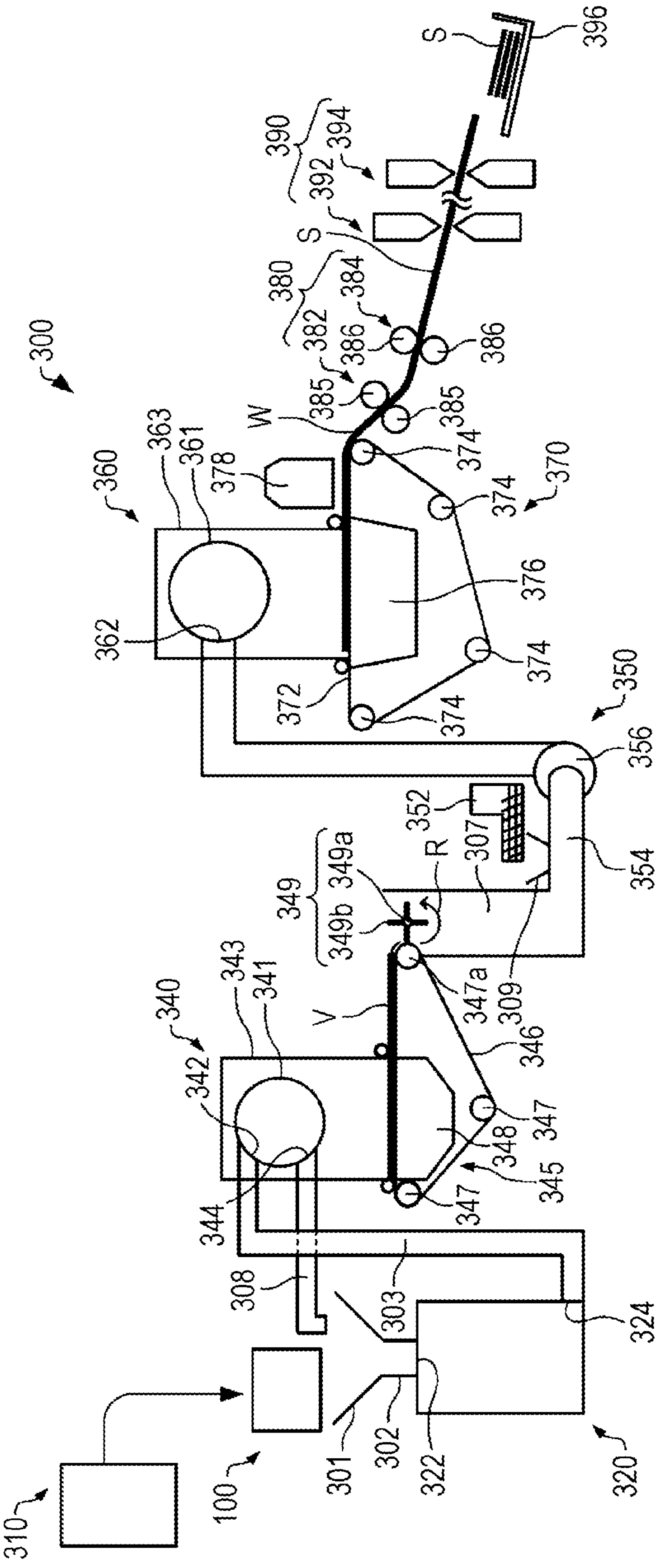
FIG. 9 is a diagram schematically illustrating a fiber treatment apparatus according to a third embodiment.

Next, a fiber treatment apparatus according to a third embodiment will be described with reference to the drawings. FIG. 9 is a diagram schematically illustrating a fiber treatment apparatus 300 according to the third embodiment.

As illustrated in FIG. 9, the fiber treatment apparatus 300 includes, for example, the coarse crushing device 100, a supply portion 310, a defibration portion 320, a sorting portion 340, a first web forming portion 345, a rotating body 349, a mixing portion 350, an accumulation portion 360, a second web forming portion 370, a sheet forming portion 380, and a cutting portion 390. For the sake of convenience, the coarse crushing device 100 is illustrated in a simplified manner in FIG. 9.

The supply portion 310 supplies the raw material to the coarse crushing device 100. The supply portion 310 is, for example, an automatic charging portion for continuously charging the raw material into the coarse crushing device 100. The raw material supplied by the supply portion 310 contains fibers such as a waste paper and a pulp sheet.

The coarse crushing device 100 cuts the raw material supplied by the supply portion 310 into fine pieces in the air such as the atmosphere. The raw material cut by the coarse crushing device 100 is received by a hopper 301 and thereafter transferred to the defibration portion 320 through a tube 302.

The defibration portion 320 defibrates the raw material cut by the coarse crushing device 100. Here, "to defibrate" means to disentangle the raw material formed by binding a plurality of fibers into fibers one by one. The defibration portion 320 also has a function of separating substances such as resin particles, ink, toner, and anti-bleeding agent attached to the raw material from the fibers.

The material passed through the defibration portion 320 is referred to as a "defibrated material". The "defibrated material" may include resin particles separated from the fibers when the fibers are disentangled, colorants such as ink and toner, and additives such as anti-bleeding agent and paper strength enhancer, in addition to the disentangled fibers of defibrated material. The shape of the disentangled defibrated material is a string. The disentangled defibrated material may be present in a state where the material is not entangled with other disentangled fibers, that is, in an independent state, or may be present in a state where the material is entangled with other disentangled defibrated material to form an agglomerated material, that is, in a state of forming a lump.

The defibration portion 320 performs defibration by a dry method. Here, the treatment of performing defibration or the like in the air such as the atmosphere, rather than in a liquid, is referred to as a dry method. As the defibration portion 320, for example, an impeller mill is used. The defibration portion 320 has a function of sucking the raw material and generating an airflow for discharging the defibrated material. As a result, the defibration portion 320 can suck the raw material with the airflow from an introduction port 322 by the airflow generated by the defibration portion 320, perform the defibration treatment, and transport the defibrated material to a discharge port 324. The defibrated material passed through the defibration portion 320 is transferred to the sorting portion 340 through a tube 303. As the airflow for transporting the defibrated material from the defibration portion 320 to the sorting portion 340, the airflow generated by the defibration portion 320 may be used, or an airflow generation device such as a blower may be provided and the airflow may be used.

The sorting portion 340 introduces the defibrated material defibrated by the defibration portion 320 from the introduction port 342, and sorts the defibrated material according to the length of the fiber. The sorting portion 340 includes a drum portion 341 and a housing portion 343 that accommodates the drum portion 341. As the drum portion 341, for example, a sieve is used. The drum portion 341 has a net and can separate fibers or particles smaller than the size of the net opening, that is, a first sorted material passing through the net, and fibers, undefibrated pieces, or lumps larger than the size of the net opening, that is, a second sorted material not passing through the net. For example, the first sorted material is transferred to the accumulation portion 360 through a tube 307. The second sorted material is returned from the discharge port 344 to the defibration portion 320 through a tube 308. Specifically, the drum portion 341 is a cylindrical sieve rotationally driven by a motor. As the net of the drum portion 341, for example, a wire net, an expanded metal obtained by extending a notched metal plate, or a punching metal having holes formed in the metal plate by a press machine or the like is used.

The first web forming portion 345 transports the first sorted material passed through the sorting portion 340 to the tube 307. The first web forming portion 345 includes a mesh belt 346, a stretching roller 347, and a suction mechanism 348.

The suction mechanism 348 can suck the first sorted material passed through the opening of the sorting portion 340 and is dispersed in the air, onto the mesh belt 346. The first sorted material is accumulated on the moving mesh belt 346 to form a web V. The basic configurations of the mesh belt 346, the stretching roller 347, and the suction mechanism 348 are the same as those of a mesh belt 372, a stretching roller 374, and a suction mechanism 376 of a second web forming portion 370 described later.

The web V is formed into a soft and inflated state containing a large amount of air by passing through the sorting portion 340 and the first web forming portion 345. The web V accumulated on the mesh belt 346 is put into the tube 307 and transported to the accumulation portion 360.

The rotating body 349 can cut the web V. In the illustrated example, the rotating body 349 includes a base portion 349*a* and a protrusion portion 349*b* protruding from the base portion 349*a*. The protrusion portion 349*b* has, for example, a plate shape. In the illustrated example, four protrusion portions 349*b* are provided, and four protrusion portions 349*b* are provided at equal intervals. When the base portion 349*a* rotates in the direction R, the protrusion portion 349*b* can rotate around the base portion 349*a* as an axis. By cutting the web V by the rotating body 349, for example, it is possible to reduce fluctuations in the amount of defibrated material supplied to the accumulation portion 360 per unit time.

The rotating body 349 is provided near the first web forming portion 345. In the illustrated example, the rotating body 349 is provided in the vicinity of the stretching roller 347*a* located on the downstream in the path of the web V. The rotating body 349 is provided at a position where the protrusion portion 349*b* can be in contact with the web V, and is not in contact with the mesh belt 346 on which the web V is accumulated. As a result, it is possible to prevent the mesh belt 346 from being worn by the protrusion portion 349*b*. The shortest distance between the protrusion portion 349*b* and the mesh belt 346 is, for example, 0.05 mm or more and 0.5 mm or less. This is the distance at which the web V can be cut without damaging the mesh belt 346.

The mixing portion 350 mixes the first sorted material passed through the sorting portion 340 and the additive containing resin. The mixing portion 350 includes an additive supply portion 352 that supplies an additive, a tube 354 that transports the first sorted material and the additive, and a blower 356. In the illustrated example, the additive is supplied from the additive supply portion 352 to the tube 354 through the hopper 309. The tube 354 is continuous with the tube 307.

In the mixing portion 350, an airflow is generated by the blower 356, and the first sorted material and the additive can be transported while being mixed in the tube 354. The mechanism for mixing the first sorted material and the additive is not particularly limited, and may be a stirring device using a high-speed rotating blade, or may be a device using container rotation such as a V-type mixer.

As the additive supply portion 352, a screw feeder as illustrated in FIG. 9 or a disc feeder not illustrated is used. The additive supplied from the additive supply portion 352 contains a resin for binding a plurality of fibers. When the resin is supplied, the plurality of fibers are not bound. The resin melts when passing through the sheet forming portion 380 and binds the plurality of fibers.

The resin supplied from the additive supply portion 352 is a thermoplastic resin or a thermosetting resin, and examples thereof include acrylonitrile styrene (AS) resin, acrylonitrile butadiene styrene (ABS) resin, polypropylene, polyethylene, polyvinyl chloride, polystyrene, acrylic resin, polyester, polyethylene terephthalate, polyphenylene ether, polybutylene terephthalate, nylon, polyamide, polycarbonate, polyacetal, polyphenylene sulfide, and polyether ether ketone. These resins may be used alone or in an appropriate mixture. The additive supplied from the additive supply portion 352 may be in the form of fiber or powder.

The additives supplied from the additive supply portion 352 may contain a colorant for coloring the fibers, a coagulation inhibitor for suppressing fiber coagulation and resin coagulation, or a flame retardant for making fibers difficult to burn, depending on the type of sheet to be manufactured, in addition to the resin for binding the fibers. The mixture passed through the mixing portion 350 is transferred to the accumulation portion 360 through the tube 354.

The accumulation portion 360 introduces the mixture passed through the mixing portion 350 from the introduction port 362, loosens the entangled defibrated material, and disperses the defibrated material in the air to drop the defibrated material. Furthermore, when the additive resin supplied from the additive supply portion 352 is fibrous, the accumulation portion 360 loosens the entangled resin. As a result, the accumulation portion 360 can accumulate the mixture on the second web forming portion 370 with good uniformity.

The accumulation portion 360 includes a drum portion 361 and a housing portion 363 that accommodates the drum portion 361. A rotating cylindrical sieve is used as the drum portion 361. The drum portion 361 has a net and causes fibers or particles contained in the mixture passed through the mixing portion 350 and smaller than the size of the net opening to drop. The configuration of the drum portion 361 is the same as the configuration of the drum portion 341, for example.

The "sieve" of the drum portion 361 may not have a function of sorting a specific object. That is, the "sieve" used as the drum portion 361 means that the sieve is provided with a net, and the drum portion 361 may drop all the mixture introduced into the drum portion 361.

The second web forming portion 370 forms the web W by accumulating a passing object passed through the accumulation portion 360. The second web forming portion 370 includes, for example, a mesh belt 372, a stretching roller 374, and a suction mechanism 376.

While moving, the mesh belt 372 accumulates the passing object passed through the opening of the accumulation portion 360. The mesh belt 372 is stretched by a stretching roller 374, and is configured to make it difficult for a passing object to pass through and to pass air. The mesh belt 372 moves as the stretching roller 374 rotates. The web W is formed on the mesh belt 372 by continuously accumulating the passing objects passed through the accumulation portion 360 while the mesh belt 372 continuously moves.

The suction mechanism 376 is provided below the mesh belt 372. The suction mechanism 376 can generate an airflow directed downward. The suction mechanism 376 can suck the mixture dispersed in the air by the accumulation portion 360 onto the mesh belt 372. As a result, the discharge speed from the accumulation portion 360 can be increased. Furthermore, the suction mechanism 376 can form a downflow in the dropping path of the mixture, and can prevent the defibrated material and the additives from being entangled with each other during the dropping.

As described above, by passing through the accumulation portion 360 and the second web forming portion 370, the web W that contains a large amount of air and is soft and inflated is formed. The web W accumulated on the mesh belt 372 is transported to the sheet forming portion 380.

In the illustrated example, a humidity control portion 378 that controls the humidity of the web W is provided. The humidity control portion 378 can add water or water vapor to the web W to regulate the amount ratio of the web W and water.

The sheet forming portion 380 pressurizes and heats the web W accumulated on the mesh belt 372 to form the sheet S. In the sheet forming portion 380, a plurality of fibers in the mixture can be bound to each other via the additive by applying heat to the mixture of the defibrated material and the additive mixed in the web W.

The sheet forming portion 380 is provided with a pressure portion 382 that presses the web W, and a heating portion 384 that heats the web W pressed by the pressure portion 382. The pressure portion 382 includes a pair of calender rollers 385 and applies pressure to the web W. When the web W is pressed, the thickness is reduced and the bulk density of the web W is increased. As the heating portion 384, for example, a heating roller, a heat press molding machine, a hot plate, a warm air blower, an infrared heater, or a flash fixing device is used. In the illustrated example, the heating portion 384 is provided with a pair of heating rollers 386. By configuring the heating portion 384 as the heating roller 386, it is possible to form the sheet S while continuously transporting the web W, as compared with the case where the heating portion 384 is configured as a plate-shaped pressing device. The calender roller 385 and the heating roller 386 are disposed, for example, so that their rotating shafts are parallel to each other. Here, the calender roller 385 can apply a higher pressure to the web W than the pressure applied to the web W by the heating roller 386. The number of calender rollers 385 and heating rollers 386 is not particularly limited.

The cutting portion 390 cuts the sheet S formed by the sheet forming portion 380. In the illustrated example, the cutting portion 390 includes a first cutting portion 392 that cuts the sheet S in a direction intersecting the transport direction of the sheet S, and a second cutting portion 394 that cuts the sheet S in a direction parallel to the transport direction. The second cutting portion 394 cuts the sheet S passed through the first cutting portion 392, for example.

As described above, a single-cut sheet S having a predetermined size is formed. The cut single-cut sheet S is discharged to the discharge portion 396.

4. Examples and Comparative Examples

4. 1. Preparing Small Pieces

As Example 1, a waste paper was treated by a coarse crushing device corresponding to the coarse crushing device 100 of FIGS. 1 to 3. The blade width of the first rotary cutter and the second rotary cutter was set to 2 mm. The distance D1 between the first rotary cutters adjacent to each other and the distance D2 between the second rotary cutters adjacent to each other were set to 6 mm. The distance D3 between the tearing portion and the roller portion was set to 26 mm. A small piece having a width of 6 mm and a length of 26 mm was obtained by the coarse crushing device of Example 1.

As Example 2, a waste paper was treated by a coarse crushing device corresponding to the coarse crushing device 200 of FIGS. 6 to 8. The blade width of the first rotary cutter and the second rotary cutter was 0.5 mm. The distance D1 and the distance D2 were set to 2 mm. The distance D5 in the Z axis direction between the tip end of the blade and the third axis was set to 15 mm. A small piece having a width of 2 mm and a length of 15 mm was obtained by the coarse crushing device of Example 2.

As Comparative Example 1, the blade width of the first rotary cutter and the second rotary cutter of Example 1 was 6 mm, and the waste paper was treated by a coarse crushing device in which the first rotary cutter and the second rotary cutter adjacent to each other were in contact with each other. A small piece having a width of 6 mm and a length of 26 mm was obtained by the coarse crushing device of Comparative Example 1. The cut surface in the longitudinal direction of the small piece was sharply cut, which was called a cross cut.

4. 2. Evaluation of Small Pieces

4. 2. 1. Evaluation Method for Information Readability

The dimensions of the small pieces prepared in Examples 1 and 2 and Comparative Example 1 were evaluated according to the DIN standard (DIN 66399) for the shredder security level. It can be said that when the DIN standard is level 4 or higher, it can be used as a shredder for treating personal information and important in-house information. The evaluation criteria for information readability are as follows.

A: DIN standard level 5 or higher
B: DIN standard level 4
C: DIN standard level 3 or lower

4. 2. 2. Evaluation Method for Fiber Length

The fiber lengths of the raw material waste paper and the small pieces prepared in Examples 1 and 2 and Comparative Example 1 were evaluated with a fiber tester. As the fiber tester, “Fiber Tester” manufactured by Lorentzen & Wettre was used. The fiber length of the raw material waste paper was set to 100 and the relative value of the fiber length of the small pieces was evaluated according to the following criteria. When the fiber length is 97 or more in relative value, it can be said that the fiber length suitable for recycling the waste paper is maintained.

A: Fiber length is 97 or more of raw material waste paper
B: Fiber length is less than 97 of raw material waste paper

4. 2. 3. Evaluation Results

FIG. 10 is a table illustrating evaluation results. As illustrated in FIG. 10, the information readability of Example 2 in which the size of the small piece was small was evaluated better than that of Example 1 and Comparative Example 1. Furthermore, in Examples 1 and 2, the raw material waste paper was torn off to prepare a small piece, so that the fiber length was longer than that of Comparative Example 1.

The present disclosure may omit a portion of the configurations or combine the embodiments and modification examples within the scope of the features and effects described in the present application.

The present disclosure is not limited to the above-described embodiment, and various modifications can be made. For example, the present disclosure includes configurations that are substantially the same as the configurations described in the embodiments. The substantially same configurations are, for example, configurations having the same function, method, and result, or configurations having the same object and effect. In addition, the present disclosure includes configurations in which non-essential parts of the configurations described in the embodiments are replaced. In addition, the present disclosure includes the configurations that achieve the same effects as the configurations described in the embodiments or the configurations that can achieve the same object. In addition, the present disclosure includes configurations in which known techniques are added to the configurations described in the embodiments.

5. Fourth Embodiment

5. 1. Coarse Crushing Device

5. 1. 1. Configuration

Figure 11:
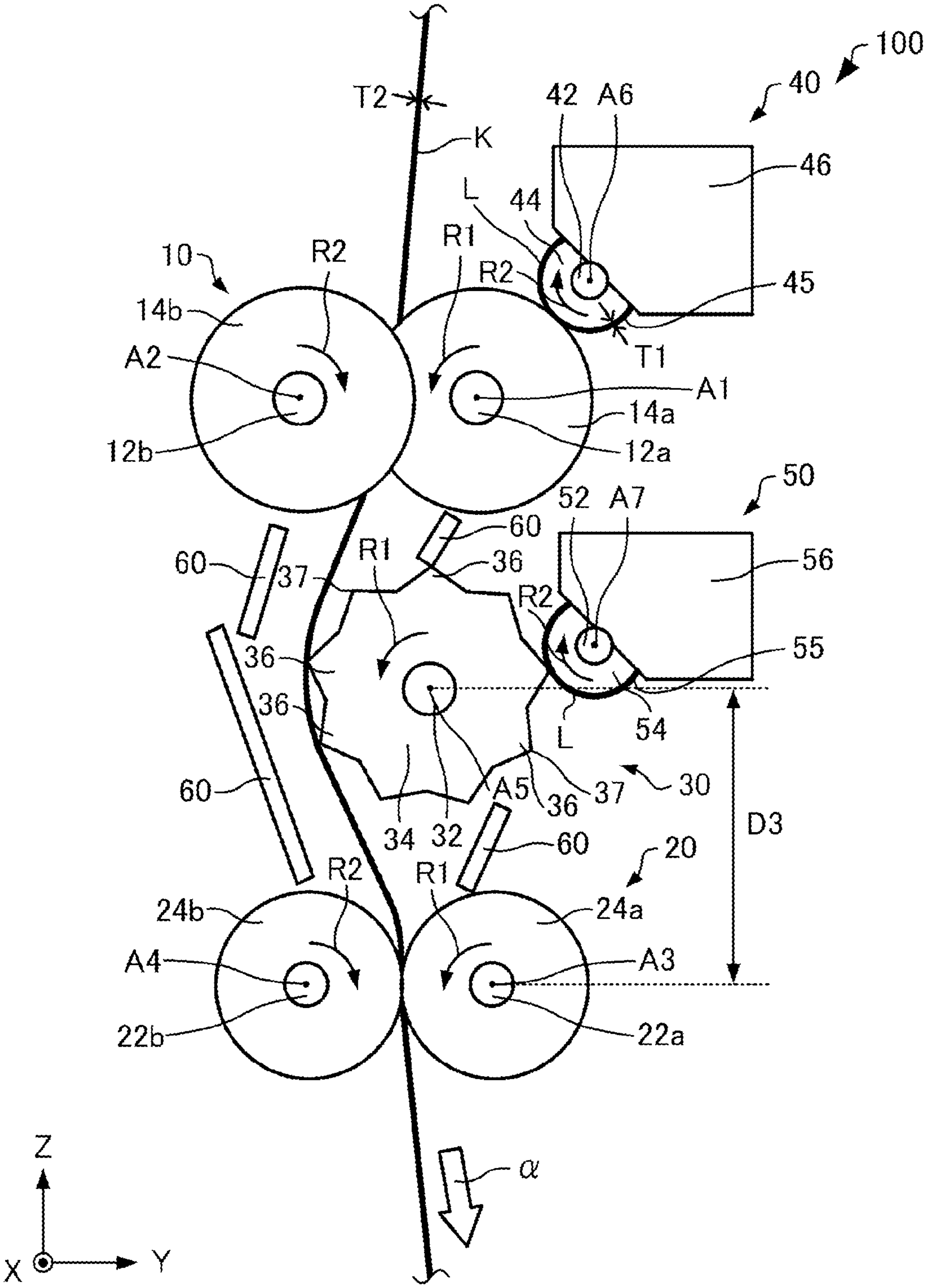
FIG. 11 is a side view schematically illustrating a coarse crushing device according to a fourth embodiment.
Figure 12:
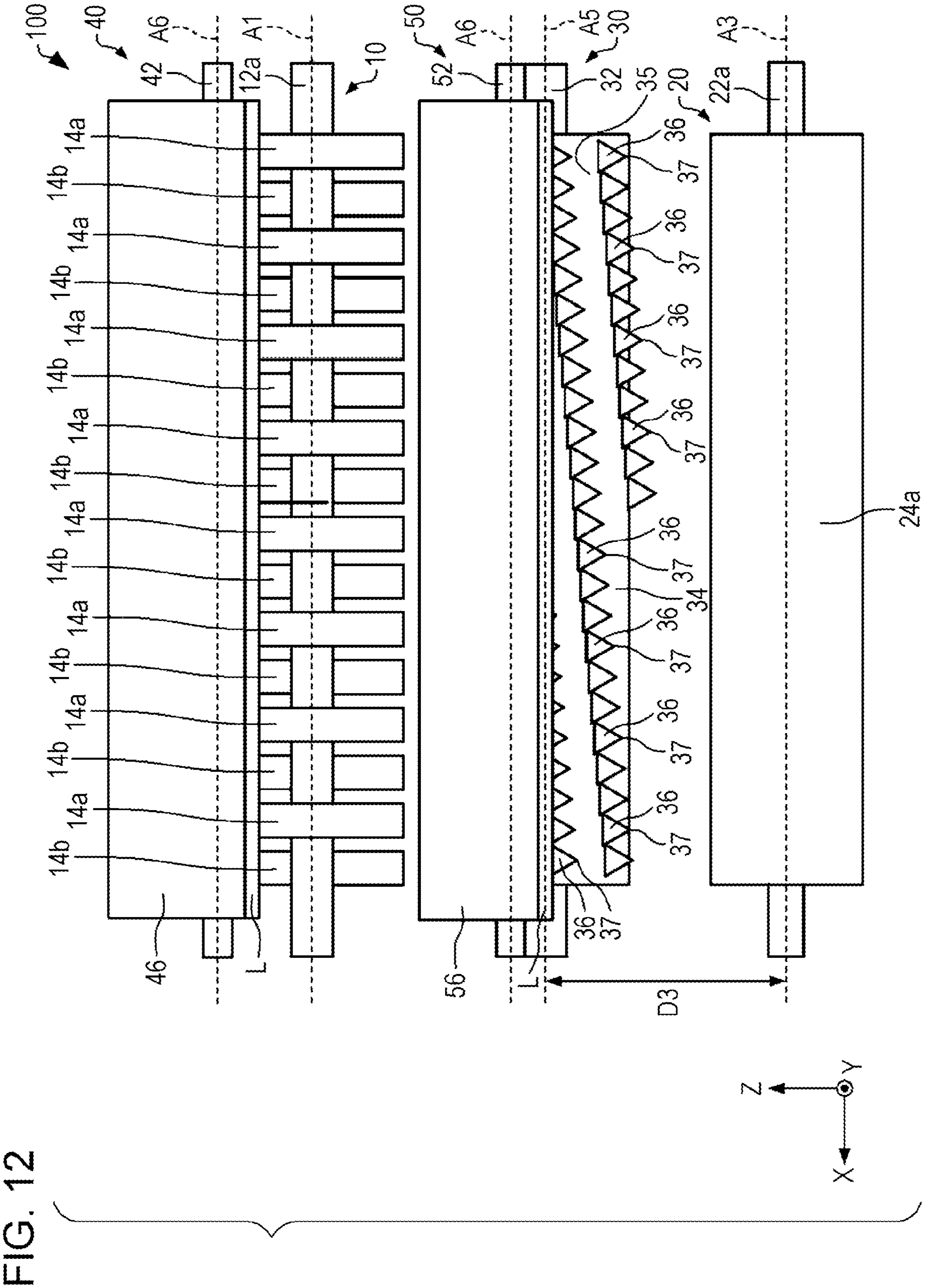
FIG. 12 is a front view schematically illustrating the coarse crushing device according to the fourth embodiment.

First, a coarse crushing device according to a fourth embodiment will be described with reference to the drawings. FIG. 11 is a side view schematically illustrating a coarse crushing device 100 according to the fourth embodiment. FIG. 12 is a front view schematically illustrating the coarse crushing device 100 according to the fourth embodiment. In FIGS. 11 and 12, the X axis, the Y axis, and the Z axis are illustrated as the three axes orthogonal to each other.

As illustrated in FIGS. 11 and 12, the coarse crushing device 100 includes, for example, the rotary cutter portion 10, the roller portion 20, the tearing portion 30, the first liquid supply portion 40, and the second liquid supply portion 50. Furthermore, the coarse crushing device 100 includes a housing (not illustrated). The housing accommodates the rotary cutter portion 10, the roller portion 20, the tearing portion 30, and the liquid supply portions 40 and 50. The housing is provided with the charging port for charging a fiber-containing sheet K to be crushed. The fiber-containing sheet K is a sheet containing fibers, and is, for example, a waste paper or a pulp sheet.

The rotary cutter portion 10 includes a first rotating shaft member **12*a*, a second rotating shaft member 12*b*, a first rotary cutter 14*a*, and a second rotary cutter 14*b*. That is, the rotary cutters 14*a* and 14*b* form the rotary cutter portion 10. Here, FIG. 13 is a plan view schematically illustrating the rotary cutter portion 10 and the first liquid supply portion 40**.

Figure 13:
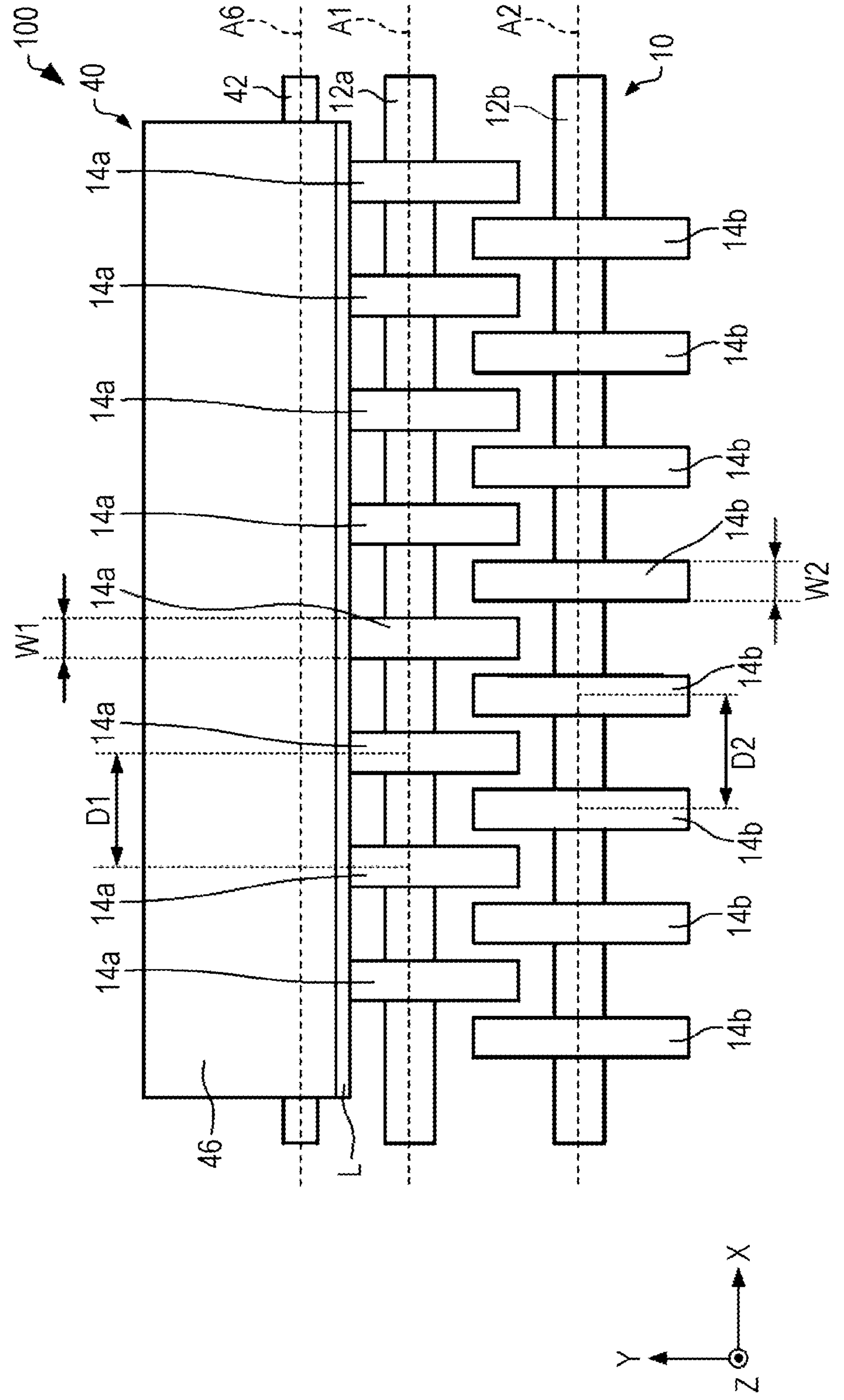
FIG. 13 is a plan view schematically illustrating a rotary cutter portion and a first liquid supply portion of the coarse crushing device according to the fourth embodiment.

The first rotating shaft member **12*a* rotates about the first axis A1 as illustrated in FIGS. 11 to 13. The second rotating shaft member 12*b* rotates reversely to the first rotating shaft member 12*a* about the second axis A2 parallel to the first axis A1. In the illustrated example, the first axis A1 and the second axis A2 are axes parallel to the X axis. The first rotating shaft member 12*a* is provided in the +Y axis direction of the second rotating shaft member 12*b*. The shape of the rotating shaft members 12*a* and 12*b* is, for example, a circle when viewed in the direction of the first axis A1. The first axis A1 direction is the extending direction of the first axis A1**, and is the X axis direction in the illustrated example.

The first rotary cutter **14*a* is provided on the first rotating shaft member 12*a*. A plurality of first rotary cutters 14*a* are provided. The first rotary cutter 14*a* is fixed to the first rotating shaft member 12*a*, and rotates in the R1 direction illustrated in FIG. 11 together with the first rotating shaft member 12*a***.

The plurality of first rotary cutters **14*a* are provided, for example, at equal intervals along the X axis. The second rotary cutter 14*b* is located between the first rotary cutters 14*a* adjacent to each other. The distance D1 between the first rotary cutters 14*a* adjacent to each other is, for example, 0.5 mm or more and 6 mm or less. Here, “distance between the first rotary cutters 14*a* adjacent to each other” means the distance between the center of one of the first rotary cutters 14*a* and the center of the other first rotary cutter 14*a* in the first rotary cutters 14*a* adjacent to each other. The same applies to the “distance between the second rotary cutters 14*b*** adjacent to each other”.

The second rotary cutter **14*b* is provided on the second rotating shaft member 12*b*. A plurality of second rotary cutters 14*b* are provided. The second rotary cutter 14*b* is fixed to the second rotating shaft member 12*b*, and rotates in an R2 direction illustrated in FIG. 1 together with the second rotating shaft member 12*b***.

The plurality of second rotary cutters **14*b* are provided, for example, at equal intervals along the X axis. The first rotary cutter 14*a* is located between the second rotary cutters 14*b* adjacent to each other. The distance D2 between the second rotary cutters 14*b* adjacent to each other is, for example, 0.5 mm or more and 6 mm or less. As illustrated in FIG. 11, a portion of the first rotary cutter 14*a* and a portion of the second rotary cutter 14*b*** overlap each other when viewed in the X axis direction. As illustrated in FIG.

12, the first rotary cutter 14*a* and the second rotary cutter 14*b* are alternately disposed in the X axis direction when viewed in the Y axis direction. The first rotary cutter 14*a* and the second rotary cutter 14*b* are separated from each other. A gap is provided between the first rotary cutter 14*a* and the second rotary cutter 14*b* adjacent to each other.

The shape of the first rotary cutter 14*a* and the second rotary cutter 14*b* is, for example, a disk shape having a thickness in the X axis direction. The thickness (blade width) W1 of the first rotary cutter 14*a* and the blade width W2 of the second rotary cutter 14*b* are, for example, 0.5 mm or more and 2.5 mm or less. The shape of the first rotary cutter 14*a* and the shape of the second rotary cutter 14*b* are, for example, the same as each other. The material of the rotary cutters 14*a* and 14*b* is not particularly limited, and is metal, for example.

As illustrated in FIGS. 11 and 12, the roller portion 20 includes, for example, the third rotating shaft member 22*a*, the fourth rotating shaft member 22*b*, the first roller 24*a*, and the second roller 24*b*.

The third rotating shaft member 22*a* rotates about a third axis A3. The fourth rotating shaft member 22*b* rotates reversely to the third rotating shaft member 22*a* about the fourth axis A4. In the illustrated example, the third axis A3 and the fourth axis A4 are axes parallel to the X axis. The third rotating shaft member 22*a* is provided in the +Y axis direction of the fourth rotating shaft member 22*b*. The shape of the rotating shaft members 22*a* and 22*b* is, for example, a circle when viewed in the X axis direction.

The first roller 24*a* is provided on the third rotating shaft member 22*a*. The first roller 24*a* is fixed to the third rotating shaft member 22*a* and rotates about the third axis A3 together with the third rotating shaft member 22*a*. In the illustrated example, the first roller 24*a* rotates in the same R1 direction as the first rotary cutter 14*a*.

The second roller 24*b* is provided on the fourth rotating shaft member 22*b*. The second roller 24*b* is fixed to the fourth rotating shaft member 22*b* and rotates about the fourth axis A4 together with the fourth rotating shaft member 22*b*. In the illustrated example, the second roller 24*b* rotates in the same R2 direction as the second rotary cutter 14*b*. The first roller 24*a* and the second roller 24*b* rotate in the directions opposite to each other.

Rotation speeds of the first roller 24*a* and the second roller 24*b* are higher than rotation speeds of the first rotary cutter 14*a* and the second rotary cutter 14*b*. That is, rotation speeds of the third rotating shaft member 22*a* and the fourth rotating shaft member 22*b* are higher than rotation speeds of the first rotating shaft member 12*a* and the second rotating shaft member 12*b*. The rotation speed of the first roller 24*a* and the rotation speed of the second roller 24*b* are, for example, the same as each other. The rotation speed of the first rotary cutter 14*a* and the rotation speed of the second rotary cutter 14*b* are, for example, the same as each other.

The shape of the first roller 24*a* and the second roller 24*b* is, for example, a cylindrical shape. The material of the rollers 24*a* and 24*b* is not particularly limited, and is, for example, plastic or rubber.

Figure 14:
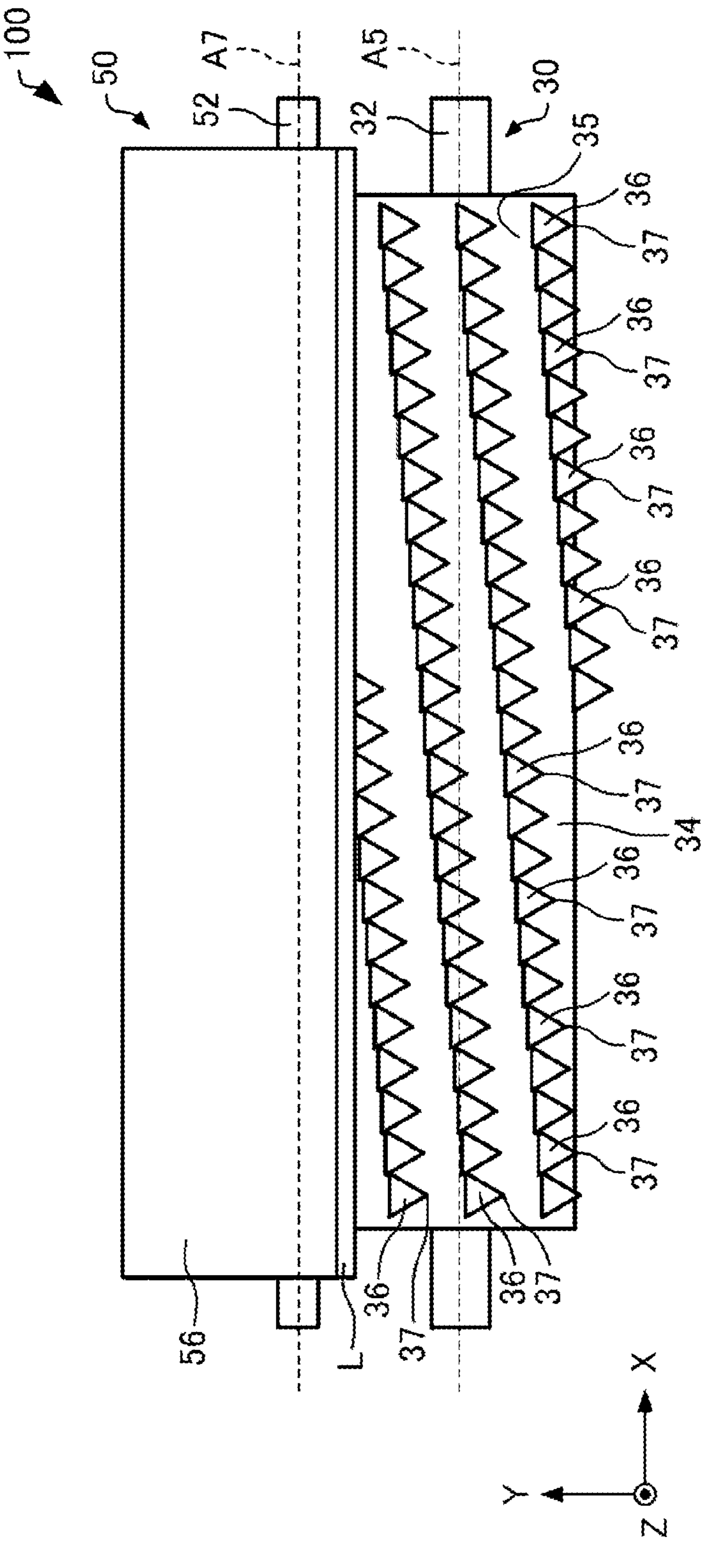
FIG. 14 is a plan view schematically illustrating a tearing portion and a second liquid supply portion of the coarse crushing device according to the fourth embodiment.

The tearing portion 30 is provided between the rotary cutter portion 10 and the roller portion 20. Here, FIG. 14 is a plan view schematically illustrating the tearing portion 30 and the second liquid supply portion 50. As illustrated in FIGS. 11, 12, and 14, the tearing portion 30 includes, for example, the fifth rotating shaft member 32, the third roller 34, and the blade 36.

The fifth rotating shaft member 32 rotates about a fifth axis A5. The fifth rotating shaft member 32 is located, for example, between the first rotary cutter 14*a* and the first roller 24*a*. In the illustrated example, the fifth axis A5 is an axis parallel to the X axis. The shape of the fifth rotating shaft member 32 is, for example, a circle when viewed in the X axis direction.

The third roller 34 is provided on the fifth rotating shaft member 32. The third roller 34 is fixed to the fifth rotating shaft member 32, and rotates about the fifth axis A5 together with the fifth rotating shaft member 32. In the illustrated example, the third roller 34 rotates in the same R1 direction as the first rotary cutter 14*a*. The rotation speed of the third roller 34 may be the same as the rotation speed of the rollers 24*a* and 24*b*, or may be higher than the rotation speeds of the rollers 24*a* and 24*b*. The shape of the third roller 34 is, for example, a cylindrical shape.

The blade 36 is provided on an outer surface 35 of the third roller 34. In the example illustrated in FIG. 11, the tip end 37 of the blade 36 is in contact with the fiber-containing sheet K. A plurality of blades 36 are provided. As illustrated in FIG. 12, the plurality of blades 36 are provided, for example, in a spiral shape about the fifth axis A5. As illustrated in FIG. 2, when viewed in the Y axis direction, for example, the plurality of blades 36 are arranged in a row inclined with respect to the X axis, and a plurality of rows are provided. The plurality of blades 36 are provided, for example, in a saw blade shape. The blade 36 may be provided integrally with the third roller 34. The material of the blade 36 and the third roller 34 is not particularly limited, and is, for example, metal.

A distance D3 between the tearing portion 30 and the roller portion 20 is, for example, 1 mm or more and 26 mm or less. Here, "distance between the tearing portion 30 and the roller portion 20" is a distance in the Z axis direction between the center of the tearing portion 30 and the center of the roller portion 20, and in the illustrated example, it is a distance in the Z axis direction between the third axis A3 and the fifth axis A5. The Z axis direction may be the vertical direction.

The first liquid supply portion 40 supplies the liquid L to the first rotary cutter 14*a*. As illustrated in FIGS. 11 to 13, the first liquid supply portion 40 includes, for example, a sixth rotating shaft member 42, a fourth roller 44, and a roller holding portion 46 that holds the fourth roller 44.

The sixth rotating shaft member 42 rotates about a sixth axis A6. In the illustrated example, the sixth axis A6 is an axis parallel to the X axis. The shape of the sixth rotating shaft member 42 is, for example, a circle when viewed in the X axis direction.

The fourth roller 44 is provided on the sixth rotating shaft member 42. The fourth roller 44 is fixed to the sixth rotating shaft member 42 and rotates about the sixth axis A6 together with the sixth rotating shaft member 42. In the illustrated example, the fourth roller 44 rotates in the same R2 direction as the second rotary cutter 14*b*. The rotation speed of the fourth roller 44 is, for example, the same as the rotation speed of the first rotary cutter 14*a*. The shape of the fourth roller 44 is, for example, a cylindrical shape.

The liquid L is applied to an outer surface 45 of the fourth roller 44. The thickness T1 of the liquid L applied to the outer surface 45 of the fourth roller 44 is, for example, 6% or more and 80% or less with respect to the thickness T2 of the fiber-containing sheet K. For example, when the thickness T2 of the fiber-containing sheet K is 90 μm, the liquid L is applied to the outer surface 45 so that the thickness T1 is 5.4 μm or more and 72 μm or less. The liquid L applied to the outer surface 45 is transmitted to the fiber-containing sheet K through the first rotary cutter 14*a* while maintaining the thickness thereof. For example, the roller holding portion 46 is provided with a liquid application portion (not illustrated) for applying the liquid L to the outer surface 45, and the liquid application portion is controlled so that the thickness T1 is 6% or more and 80% or less with respect to the thickness T2.

The second liquid supply portion 50 supplies the liquid L to the blade 36 of the tearing portion 30. As illustrated in FIGS. 11, 12, and 14, the second liquid supply portion 50 includes, for example, a seventh rotating shaft member 52, a fifth roller 54, and a roller holding portion 56 that holds the fifth roller 54.

The seventh rotating shaft member 52 rotates about the seventh axis A7. In the illustrated example, the seventh axis A7 is an axis parallel to the X axis. The shape of the seventh rotating shaft member 52 is, for example, a circle when viewed in the X axis direction.

The fifth roller 54 is provided on the seventh rotating shaft member 52. The fifth roller 54 is fixed to the seventh rotating shaft member 52 and rotates about the seventh axis A7 together with the seventh rotating shaft member 52. In the illustrated example, the fifth roller 54 rotates in the same R2 direction as the fourth roller 44. The rotation speed of the fifth roller 54 is the same as the rotation speed of the third roller 34, for example. The shape of the fifth roller 54 is, for example, a cylindrical shape. The liquid L is applied to an outer surface 55 of the fifth roller 54. The outer surface 45 of the fourth roller 44 and the outer surface 55 of the fifth roller 54 may be smooth, may be uneven, or may be porous. The material of the rollers 44 and 54 is not particularly limited, and is, for example, metal, plastic, rubber or the like.

The liquid L contains water. The liquid L may be water. Examples of water include pure water such as ion-exchanged water, ultrafiltered water, reverse osmosis water, and distilled water, and water in which ionic impurities are removed as much as possible such as ultrapure water. By applying water to the fiber-containing sheet K, hydrogen bonds between fibers can be loosened, and the fiber-containing sheet K can be easily torn off.

The liquid L may contain a moisturizing agent. Since the liquid L contains the moisturizing agent, the water retaining effect of the liquid L can be enhanced. As a result, it is possible to prevent the fiber-containing sheet K to which the liquid L is applied from being dried after the liquid L is applied to the fiber-containing sheet K and before the fiber-containing sheet K is torn off.

Examples of the moisturizing agent include diethylene glycol, triethylene glycol, propylene glycol, dipropylene glycol, 1,3-propanediol, 1,3-butylene glycol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 1,2-hexanediol, 2-ethyl-1,3-hexanediol, 3-methyl-1,5-pentanediol, 2-methylpentane-2,4-diol, trimethylolpropane, and glycerin. In addition, the moisturizing agent is not particularly limited as long as the moisturizing agent is a solvent having hygroscopicity, and examples thereof include diol and polyol having two or more hydroxyl groups. Furthermore, as the moisturizing agent, glycerin or propylene glycol, which is a solvent having a water content of 1% or more (amount of water contained in 100 g of solvent is 1 g or more) under a temperature of 23° C. and a relative humidity of 50%, is preferable.

The liquid L may contain a surface tension regulating agent. Since the liquid L contains the surface tension regulating agent, the liquid L can easily penetrate into the inside of the fiber-containing sheet K. As a result, the liquid L is allowed to penetrate into the fiber-containing sheet K after the liquid L is applied to the fiber-containing sheet K and before the fiber-containing sheet K is torn off, and the bond between the fibers can be weakened in a short time. The content of the surface tension regulating agent to the liquid L is, for example, 0.01% by mass or more and 30% by mass or less, and preferably 0.1% by mass or more and 20% by mass or less. Within this range, the liquid L can easily penetrate into the inside of the fiber-containing sheet K.

Examples of the surface tension regulating agent include glycol ethers such as triethylene glycol monobutyl ether, triethylene glycol dimethyl ether, triethylene glycol diethyl ether, triethylene glycol dibutyl ether, and triethylene glycol methyl butyl ether, silicone-based surfactant, acetylene glycol-based surfactant, acetylene alcohol-based surfactant, and fluorine-based surfactant. Examples of the surfactant include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D manufactured by Air Products & Chemicals, Inc., Olphin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 manufactured by Nisshin Chemical Industry Co., Ltd., Acetylenol E00, E00P, E40, E100 manufactured by Kawaken Fine Chemicals Co., Ltd.

Examples of other additives that can be contained in the liquid L include an ultraviolet absorber, a light stabilizer, a quencher, an antioxidant, a water resistance agent, a fungicide, a preservative, a thickener, a fluidity improver, a pH regulating agent, defoamer, a foam suppressor, a leveling agent, and an antistatic agent.

The coarse crushing device 100 may include a guide portion 60 that guides the fiber-containing sheet K from the rotary cutter portion 10 to the roller portion 20, as illustrated in FIG. 11. The shape and number of the guide portions 60 are not particularly limited. For the sake of convenience, the illustration of the guide portion 60 is omitted in FIG. 12.

5. 1. 2. Operation

Figure 15:
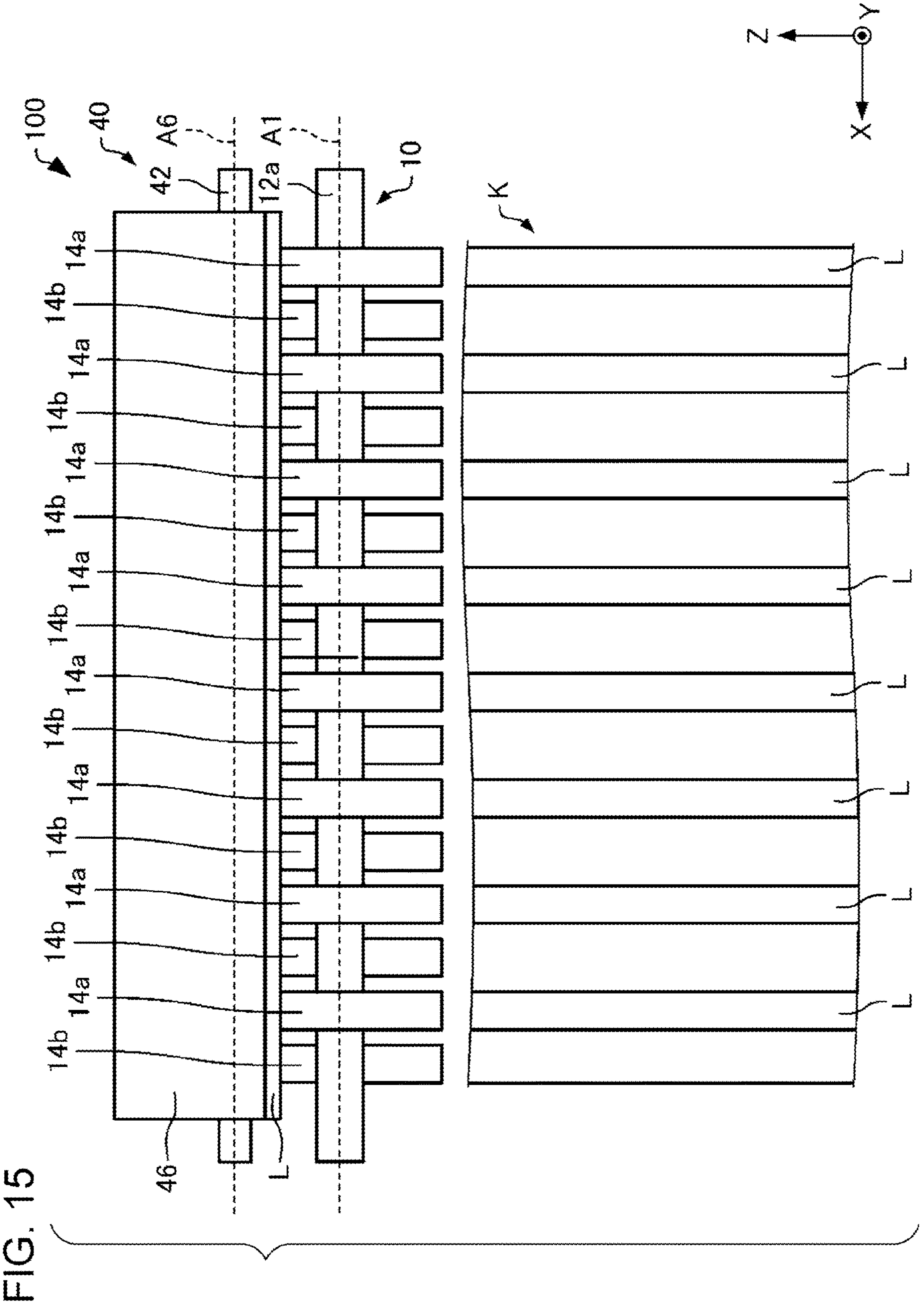
FIG. 15 is a diagram for describing an operation of the coarse crushing device according to the fourth embodiment.

When the fiber-containing sheet K is charged from the charging port (not illustrated) of the coarse crushing device 100, the fiber-containing sheet K enters the rotary cutter portion 10 as illustrated in FIG. 11. The first rotary cutter 14*a* and the second rotary cutter 14*b* of the rotary cutter portion 10 are separated from each other. Furthermore, the liquid L is supplied from the first liquid supply portion 40 to the first rotary cutter 14*a*, and the liquid L is applied to the fiber-containing sheet K when the fiber-containing sheet K comes into contact with the first rotary cutter 14*a*, as illustrated in FIG. 15.

Figure 16:
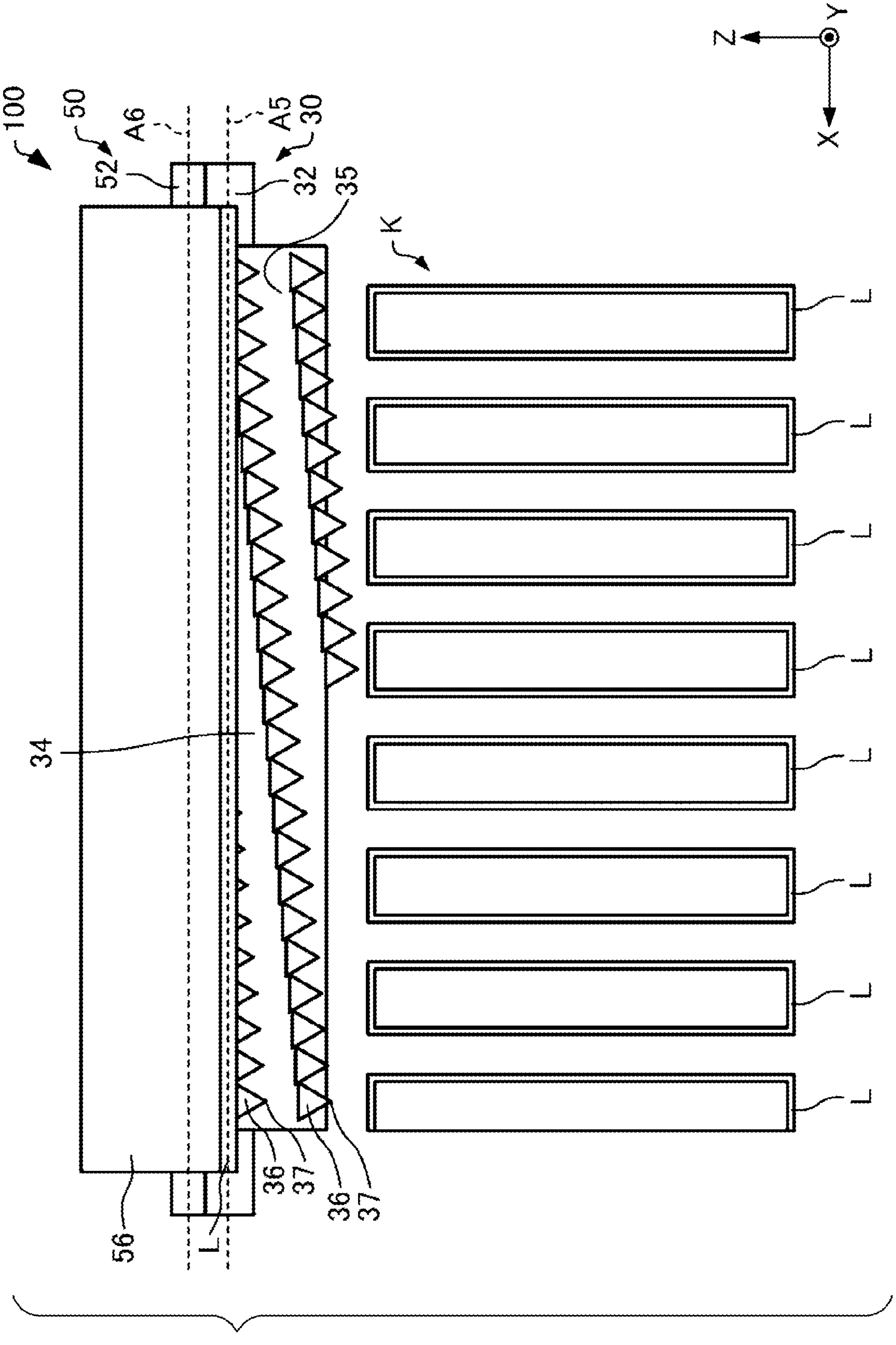
FIG. 16 is a diagram for describing the operation of the coarse crushing device according to the fourth embodiment.

Since the rotary cutters 14*a* and 14*b* are separated from each other and the liquid L is applied to the fiber-containing sheet K, the rotary cutter portion 10 tears off the fiber-containing sheet K in the first direction by the rotary cutters 14*a* and 14*b*. In the illustrated example, the first direction is the X axis direction. As a result, a fissure is formed in the fiber-containing sheet K along the Z axis direction. Since the liquid L is not supplied to the second rotary cutter 14*b*, the liquid L is applied only to one surface of the fiber-containing sheet K. FIG. 15 and FIG. 16 described later are diagrams for describing the operation of the coarse crushing device 100. For the sake of convenience, FIG. 15 illustrates a state before the fiber-containing sheet K is torn off by the rotary cutters 14*a* and 14*b*.

Next, the fiber-containing sheet K comes into contact with the tearing portion 30 and enters the roller portion 20. The roller portion 20 pinches the fiber-containing sheet K passed through the rotary cutter portion 10 by the rollers 24*a* and 24*b*. The fiber-containing sheet K is pulled by being pinched by the roller portion 20 and is stretched between the rotary cutter portion 10 and the roller portion 20.

The blade 36 of the tearing portion 30 is in contact with the fiber-containing sheet K in a state where the fiber-containing sheet K is pulled. Furthermore, the liquid L is supplied to the blade 36 from the second liquid supply portion 50, and when the fiber-containing sheet K comes into contact with the blade 36, the liquid L is applied to the fiber-containing sheet K as illustrated in FIG. 6. Therefore, the blade 36 tears off the fiber-containing sheet K in the second direction intersecting the first direction. The second direction is, for example, the Z axis direction. As a result, a fissure is formed in the fiber-containing sheet K along the X axis direction, and the fiber-containing sheet K is a small piece. The blade 36 applies the liquid L to the same surface (surface of the fiber-containing sheet K) as the surface to which the liquid L is supplied by the first rotary cutter 14*a*.

As described above, the coarse crushing device 100 tears off the fiber-containing sheet K into small pieces. The coarse crushing device 100 is a shredder that tears off the fiber-containing sheet K. The small piece has, for example, a shape having a longitudinal direction in the sheet passing direction α of the fiber-containing sheet K. The size of the small piece in the longitudinal direction (length of the small piece) is determined by the distance D3 between the tearing portion 30 and the roller portion 20. The size of the small piece in the lateral direction (width of the small piece) is determined by the distance D1 between the first rotary cutters 14*a* adjacent to each other and the distance D2 between the second rotary cutters 14*b* adjacent to each other.

5. 1. 3. Effect

The coarse crushing device 100 has the following effects, for example.

The coarse crushing device 100 includes the first liquid supply portion 40 that supplies the liquid L to the first rotary cutter 14*a*. Therefore, in the coarse crushing device 100, the liquid L can be applied to the fiber-containing sheet K by the first rotary cutter 14*a*, and the bond between the fibers of the fiber-containing sheet K can be weakened. As a result, the fiber-containing sheet K is flexible and is unlikely to be cut. When the fiber-containing sheet K is cut, the fibers are short. Furthermore, in the coarse crushing device 100, the first rotary cutter 14*a* and the second rotary cutter 14*b* are separated from each other. As a result, the fiber-containing sheet K is unlikely to be cut. As described above, in the coarse crushing device 100, the fiber-containing sheet K can be torn off by the rotary cutters 14*a* and 14*b*, and the fibers can be left to be long. By reusing such long fibers, a sheet having high paper strength can be formed.

Furthermore, in the coarse crushing device 100, the liquid L is applied to the fiber-containing sheet K by the first rotary cutter 14*a* so that the liquid L can be prevented from being applied to a portion that cannot be torn off by the rotary cutters 14*a* and 14*b*.

Furthermore, in the coarse crushing device 100, the liquid L is supplied to the first rotary cutter 14*a* and the liquid L is not supplied to the second rotary cutter 14*b*. As a result, the liquid L is not applied to both surfaces of the fiber-containing sheet K. Therefore, it is possible to prevent the fiber-containing sheet K from being too flexible and being unlikely to be torn off. When the liquid L is applied to both surfaces of the fiber-containing sheet K, the fiber-containing sheet K may be too flexible and may not be torn off.

The coarse crushing device 100 includes the second liquid supply portion 50 that supplies the liquid L to the blade 36 of the tearing portion 30. Therefore, in the coarse crushing device 100, the liquid L can be applied to the fiber-containing sheet K by the blade 36, and the bond between the fibers of the fiber-containing sheet K can be weakened. As a result, the fiber-containing sheet K is flexible and is unlikely to be cut.

Furthermore, in the coarse crushing device 100, the first rotary cutter 14*a* and the second rotary cutter 14*b* form the rotary cutter portion 10 that tears off the fiber-containing sheet K in the first direction. Furthermore, the coarse crushing device 100 includes the roller portion 20 that pinches the fiber-containing sheet K, and the tearing portion 30 that is provided between the rotary cutter portion 10 and the roller portion 20 and has the plurality of blades 36 for tearing off the fiber-containing sheet K in the second direction intersecting the first direction. The roller portion 20 includes the first roller 24*a* and the second roller 24*b* that rotate in the directions opposite to each other. Therefore, the roller portion 20 can pull the fiber-containing sheet K passed through the rotary cutter portion 10 in the coarse crushing device 100. The tearing portion 30 can tear off the fiber-containing sheet K in a state where the fiber-containing sheet K is pulled by the roller portion 20. Therefore, the tearing portion 30 can reliably tear off the fiber-containing sheet K as compared with the case where the fiber-containing sheet is not pulled.

In the coarse crushing device 100, the tearing portion 30 includes a third roller 34 having a blade 36 on the outer surface 35. Therefore, the tearing portion 30 can tear off the fiber-containing sheet K by rotating the third roller 34.

In the coarse crushing device 100, the distance D1 between the first rotary cutters 14*a* adjacent to each other is 6 mm or less, the distance D2 between the second rotary cutters 14*b* adjacent to each other is 6 mm or less, and the distance D3 between the tearing portion 30 and the roller portion 20 is 26 mm or less. Therefore, in the coarse crushing device 100, the fiber-containing sheet K can be made finer as compared with the case where the distance D1 is larger than 6 mm, the distance D2 is larger than 6 mm, and the distance D3 is larger than 26 mm.

In the coarse crushing device 100, the thickness T1 of the liquid L applied to the outer surface 45 of the fourth roller 44 is 6% or more and 80% or less with respect to the thickness T2 of the fiber-containing sheet K. When the thickness T1 is 6% or more with respect to the thickness T2, the liquid L can be applied to the fiber-containing sheet K in an amount sufficient to weaken the bond between the fibers of the fiber-containing sheet K. When the thickness T1 is 80% or less with respect to the thickness T2, it is possible to prevent the fiber-containing sheet K from being too flexible and not being torn off.

In the coarse crushing device 100, the first liquid supply portion 40 includes the fourth roller 44 having the outer surface 45 applied with the liquid L. Therefore, the first liquid supply portion 40 can supply the liquid L to the first rotary cutter 14*a* by rotating the fourth roller 44.

In the coarse crushing device 100, the blade width W1 of the first rotary cutter 14*a* is 0.5 mm or more and 2.5 mm or less. When the blade width W1 is 0.5 mm or more, the liquid L can be applied to the fiber-containing sheet K in an amount sufficient to weaken the bond between the fibers of the fiber-containing sheet K. When the blade width W1 is 2.5 mm or less, since the amount of the liquid L applied to the fiber-containing sheet K is too large, it is possible to prevent the fiber-containing sheet K from being too flexible and not being torn off. Furthermore, when the blade width W1 is larger than 2.5 mm, the distance between the first rotary cutter and the second rotary cutter decreases, and the fiber-containing sheet K may be cut.

The plurality of blades 36 are provided in a spiral shape in the coarse crushing device 100. Therefore, the plurality of blades 36 come in contact with the fiber-containing sheet K with a time difference. As a result, the fiber-containing sheet K can be torn off with a small force as compared with the case where all of the plurality of blades 36 simultaneously come in contact with the fiber-containing sheet.

In the above example, although the tearing portion 30 includes the third roller 34 having the plurality of blades 36 on the outer surface 35, the tearing portion 30 may have a plate-shaped member having the plurality of blades 36 on one side.

In the above description, although the fiber-containing sheet K is described as an example in which the fiber-containing sheet K is pinched by the roller portion 20 after passing through the rotary cutter portion 10, the fiber-containing sheet K may be torn off by the rotary cutter portion 10 after passing through the roller portion 20. That is, the roller portion 20 may be located near the charging port (not illustrated), and the fiber-containing sheet K charged from the charging port may pass through the roller portion 20 before the rotary cutter portion 10.

6. Fifth Embodiment

Figure 17:
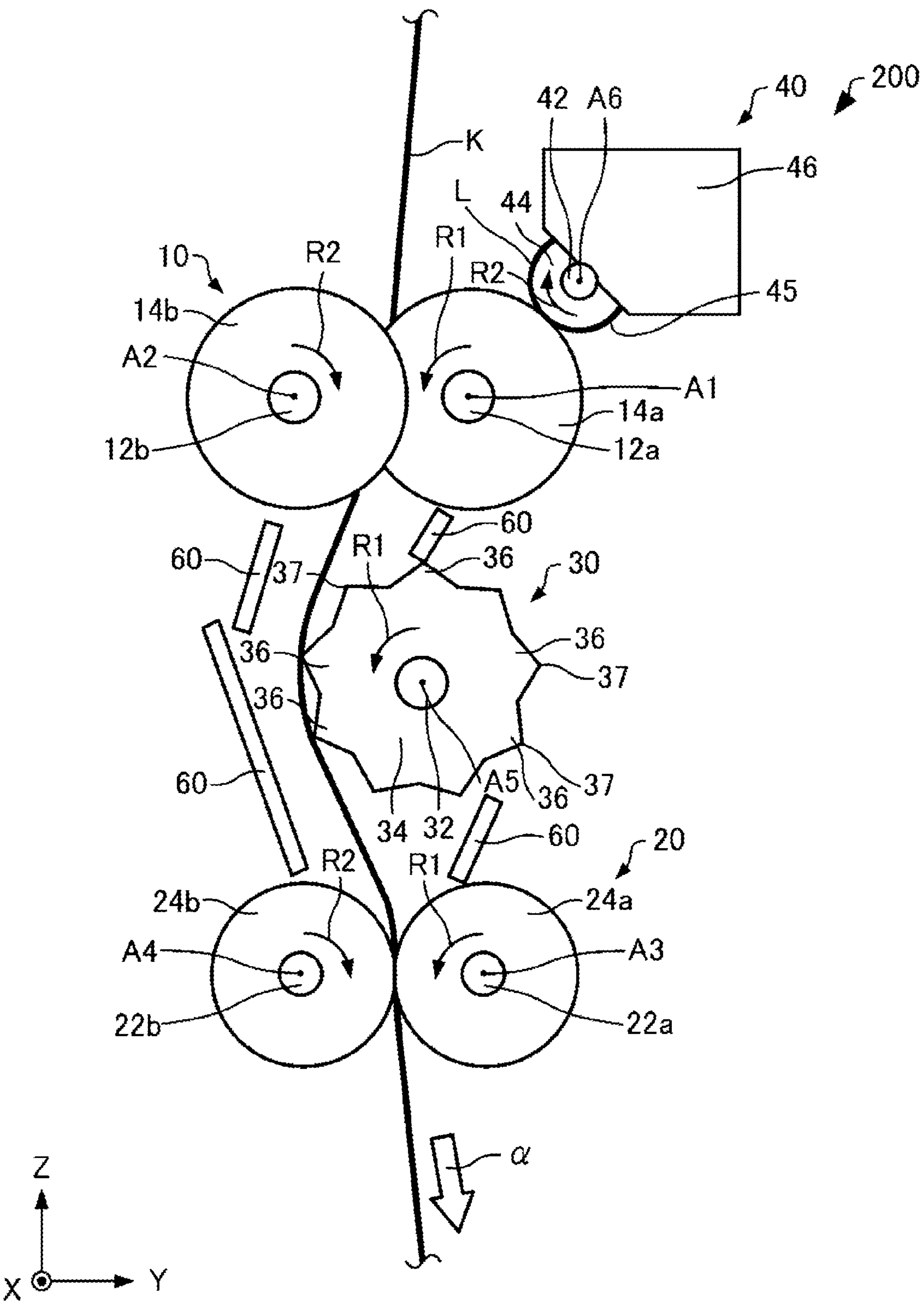
FIG. 17 is a side view schematically illustrating a coarse crushing device according to a fifth embodiment.
Figure 18:
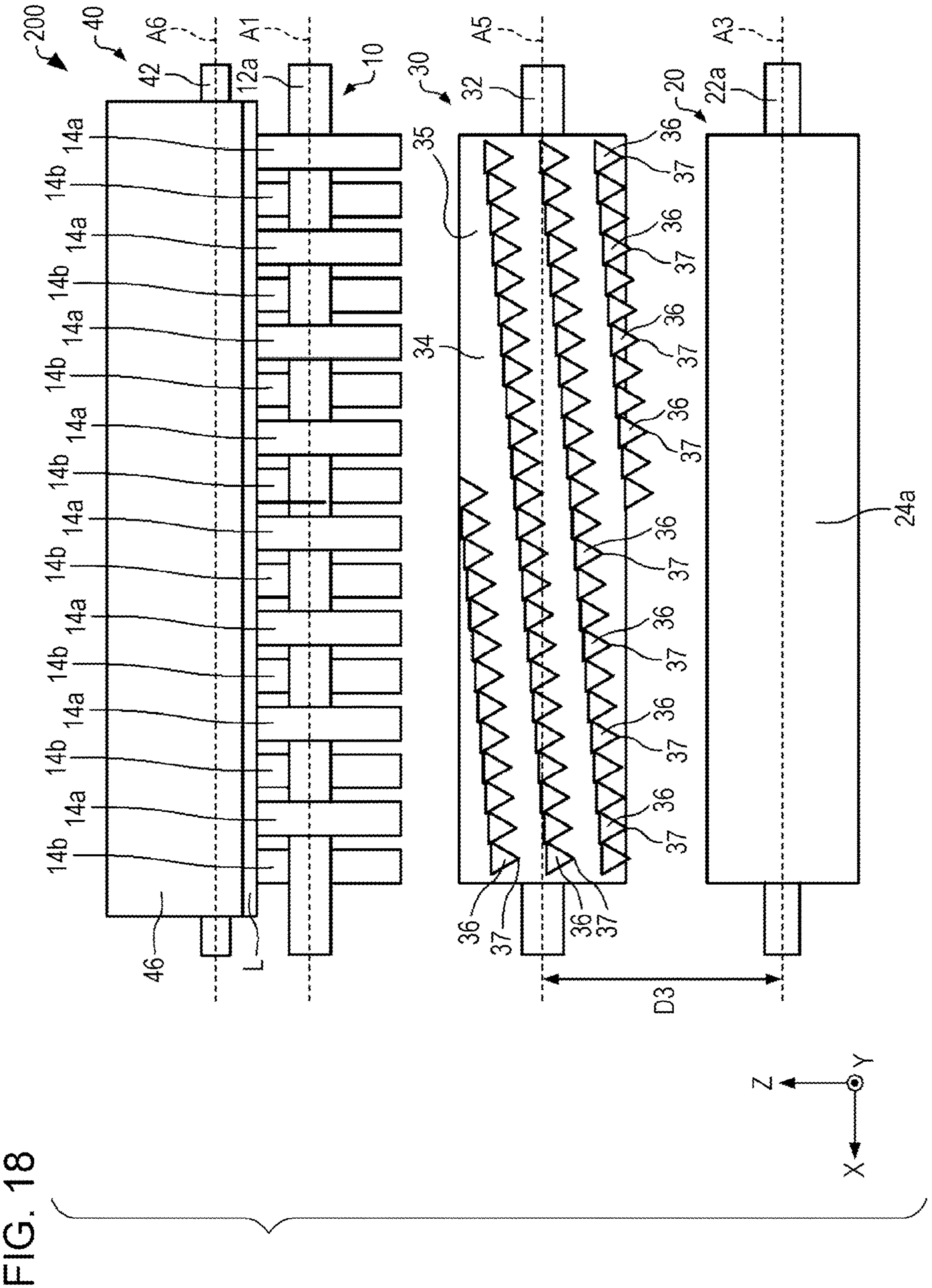
FIG. 18 is a front view schematically illustrating the coarse crushing device according to the fifth embodiment.

Next, a coarse crushing device according to a fifth embodiment will be described with reference to the drawings. FIG. 17 is a side view schematically illustrating a coarse crushing device 200 according to the fifth embodiment. FIG. 18 is a front view schematically illustrating the coarse crushing device 200 according to the fifth embodiment.

Hereinafter, in the coarse crushing device 200 according to the fifth embodiment, members having the same functions as those of the constituent members of the coarse crushing device 100 according to the fourth embodiment described above are denoted by the same reference numerals, and detailed description thereof will be omitted.

In the above-described coarse crushing device 100, as illustrated in FIGS. 11 and 12, the second liquid supply portion 50 that supplies the liquid L to the blade 36 of the tearing portion 30 is included. On the other hand, the coarse crushing device 200 does not include the second liquid supply portion 50 as illustrated in FIGS. 17 and 18.

In the coarse crushing device 200, similarly to the above-described coarse crushing device 100, the liquid L can be applied to the fiber-containing sheet K by the first rotary cutter 14*a* and the bond between the fibers of the fiber-containing sheet K can be weakened.

7. Examples and Comparative Examples

7. 1. Preparing Small Pieces

As an example, a waste paper was treated by a coarse crushing device corresponding to the coarse crushing device 100 illustrated in FIGS. 11 to 14. As a comparative example, the waste paper was treated by the same coarse crushing device as in the example except that the first liquid supply portion and the second liquid supply portion were not provided.

7. 2. Evaluation of Small Pieces

7. 2. 1. Evaluation Method for Information Readability

The dimensions of the small pieces prepared in the examples and the comparative example were evaluated according to the DIN standard (DIN 66399) for the shredder security level. It can be said that when the DIN standard is level 4 or higher, it can be used as a shredder for treating personal information and important in-house information. The evaluation criteria for information readability are as follows.

A: DIN standard level 4 or higher
B: DIN standard level 3
C: DIN standard level 2 or lower

7. 2. 2. Evaluation Method for Fiber Length

The fiber lengths of the raw material waste paper and the small pieces prepared in the examples and the comparative example were evaluated with a fiber tester. As the fiber tester, "Fiber Tester" manufactured by Lorentzen & Wettre was used. The fiber length of the raw material waste paper was set to 100 and the relative value of the fiber length of the small pieces was evaluated according to the following criteria. When the fiber length is 96 or more in relative value, it can be said that the fiber length suitable for recycling the waste paper is maintained.

A: Fiber length is 98 or more of the raw material waste paper
B: Fiber length is 97 or more and less than 98 of the raw material waste paper
C: Fiber length is 96 or more and less than 97 of the raw material waste paper
D: Fiber length is less than 96 of the raw material waste paper

7. 2. 3. Evaluation Results

FIG. 19 is a table illustrating the evaluation results. As illustrated in FIG. 19, in the examples, the distance D1 between the first rotary cutters adjacent to each other, the distance D2 between the second rotary cutters adjacent to each other, the distance D3 between the tearing portion and the roller portion, the blade width W1 of the first rotary cutter, and the ratio T1/T2 with respect to the thickness T1 of the liquid L to the thickness T2 of the fiber-containing sheet K were changed. The blade width W2 of the second rotary cutter was the same as the blade width W1. Furthermore, the components of the liquid L were changed as illustrated in FIG. 19. In FIG. 19, the number of the liquid L indicates the mass part of each component.

As illustrated in FIG. 19, in Examples 3 to 6 in which the component of the liquid L was changed, good results were obtained for both the information readability and the fiber length.

In Example 7, since the ratio T1/T2 was small, the amount of the liquid L applied to the fiber-containing sheet K was small. Therefore, the fiber length was shorter than that in Example 3.

In Example 9, since the blade width W1 was small, the amount of the liquid L applied to the fiber-containing sheet K was small. Therefore, the fiber length was shorter than that in Example 3.

In Example 10, since the blade width W1 was large, the gap between the first rotary cutter and the second rotary cutter was small. Therefore, the fiber length was shorter than that in Example 3.

In Example 11, since the distances D1 and D2 were large, the width of the small piece was large. Therefore, the information readability was deteriorated as compared with Example 3.

In Example 12, since the distance D3 was large, the length of the small piece was large. Therefore, the information readability was deteriorated as compared with Example 3.

In Example 13, since the ratio T1/T2 was small, the amount of the liquid L applied to the fiber-containing sheet K was small. Therefore, the fiber length was shorter than that in Example 3.

In Example 14, since the ratio T1/T2 was large, the amount of the liquid L applied to the fiber-containing sheet K was large. Therefore, the fiber-containing sheet K was too soft and was difficult to be torn off, and the information readability was deteriorated as compared with Example 3.

In Example 15, since the blade width W1 was small, the amount of the liquid L applied to the fiber-containing sheet K was small. Therefore, the fiber length was shorter than that in Example 3.

In Example 16, since the blade width W1 was large, the amount of the liquid L applied to the fiber-containing sheet K was large, and the gap between the first rotary cutter and the second rotary cutter was small. Therefore, as compared with Example 1, the information readability was deteriorated and the fiber length was shortened.

In Comparative Example 2, since the first liquid supply portion and the second liquid supply portion were not provided, the fiber length was shorter than these in Examples 3 to 16.

The present disclosure may omit a portion of the configurations or combine the embodiments and modification examples within the scope of the features and effects described in the present application.

The present disclosure is not limited to the above-described embodiment, and various modifications can be made. For example, the present disclosure includes configurations that are substantially the same as the configurations described in the embodiments. The substantially same configurations are, for example, configurations having the same function, method, and result, or configurations having the same object and effect. In addition, the present disclosure includes configurations in which non-essential parts of the configurations described in the embodiments are replaced. In addition, the present disclosure includes the configurations that achieve the same effects as the configurations described in the embodiments or the configurations that can achieve the same object. In addition, the present disclosure includes configurations in which known techniques are added to the configurations described in the embodiments.

What is claimed is:

1. A coarse crushing device comprising:

a rotary cutter portion tearing off a fiber-containing sheet in a first direction;

a roller portion pinching the fiber-containing sheet; and a tearing portion provided between the rotary cutter portion and the roller portion, and having a plurality of blades tearing off the fiber-containing sheet in a second direction intersecting the first direction, wherein the rotary cutter portion includes a first rotating shaft member rotating about a first axis, a second rotating shaft member rotating reversely to the first rotating shaft member about a second axis parallel to the first axis, a plurality of first rotary cutters provided on the first rotating shaft member and rotating together with the first rotating shaft member, and a plurality of second rotary cutters provided on the second rotating shaft member and rotating together with the second rotating shaft member, one second rotary cutter of the second rotary cutters is located between two adjacent first rotary cutters of the first rotary cutters and is separated and spaced apart from both of the two adjacent first rotary cutters, the adjacent first rotary cutters are adjacent to each other, one first rotary cutter of the first rotary cutters is located between two adjacent second rotary cutters of the second rotary cutters and is separated and spaced apart from both of the two adjacent second rotary cutters, the adjacent second rotary cutters are adjacent to each other, the first rotary cutters and the second rotary cutters are separated from each other, the roller portion includes a first roller and a second roller rotating in directions opposite to each other, the first roller rotates about a third axis parallel to the first axis, the second roller rotates about a fourth axis parallel to the first axis, the first axis, the second axis, the third axis, and the fourth axis extend in an axial direction, at least a part of the blades of the tearing portion crosses a first virtual straight line as viewed in the axial direction, when tearing off the fiber-containing sheet in the second direction, the first virtual straight line couples a first middle point to a second middle point, the first middle point is positioned at a middle point between the first axis and the second axis and positioned on a second virtual straight line extending from the first axis to the second axis in a perpendicular direction perpendicular to the axial direction, and the second middle point is positioned at a middle point between the third axis and the fourth axis and positioned on a third virtual straight line extending from the third axis to the fourth axis in the perpendicular direction, and the tearing portion tears off the fiber-containing sheet when the fiber-containing sheet is pinched by the roller portion.

2. The coarse crushing device according to claim 1, wherein the roller portion pinches the fiber-containing sheet passed through the rotary cutter portion, and rotation speeds of the first roller and the second roller are higher than rotation speeds of the first rotary cutter and the second rotary cutter.

3. The coarse crushing device according to claim 1, wherein the rotary cutter portion tears off the fiber-containing sheet passed through the roller portion, and rotation speeds of the first rotary cutter and the second rotary cutter are higher than rotation speeds of the first roller and the second roller.

4. The coarse crushing device according to claim 1, wherein the tearing portion includes a roller provided with the blade on an outer surface thereof.

5. The coarse crushing device according to claim 4, wherein a plurality of the blades are provided in a spiral shape.

6. The coarse crushing device according to claim 4, wherein a tip end of the blade is bent in a rotation direction of the roller of the tearing portion.

7. The coarse crushing device according to claim 1, wherein the tearing portion includes a plate-shaped member provided with the blade on one side, and a distance between the first virtual straight line and a tip end of the blade is 0.5 mm or more and 5 mm or less.

8. The coarse crushing device according to claim 1, wherein a distance between the two adjacent first rotary cutters is 6 mm or less, a distance between the two adjacent second rotary cutters is 6 mm or less, and a distance between the tearing portion and the roller portion is 26 mm or less.

9. A fiber treatment apparatus comprising:

the coarse crushing device according to claim 1.

10. A coarse crushing device comprising:

a rotary cutter portion including a first rotating shaft member rotating about a first axis, a second rotating shaft member rotating reversely to the first rotating shaft member about a second axis parallel to the first axis, a plurality of first rotary cutters provided on the first rotating shaft member and rotating together with the first rotating shaft member, a plurality of second rotary cutters provided on the second rotating shaft member and rotating together with the second rotating shaft member, and a first liquid supply portion supplying a liquid to the first rotary cutters, one second rotary cutter of the second rotary cutters being located between two adjacent first rotary cutters of the first rotary cutters and being separated and spaced apart from both of the two adjacent first rotary cutters, the adjacent first rotary cutters being adjacent to each other, one first rotary cutter of the first rotary cutters being located between two adjacent second rotary cutters of the second rotary cutters and being separated and spaced apart from both of the two adjacent second rotary cutters, the adjacent second rotary cutters being adjacent to each other, and the first rotary cutters and the second rotary cutters being separated from each other, the first rotary cutter and the second rotary cutter tearing off a fiber-containing sheet in a first direction;

a roller portion pinching the fiber-containing sheet;

a tearing portion provided between the rotary cutter portion and the roller portion, and having a plurality of blades tearing off the fiber-containing sheet in a second direction intersecting the first direction; and a second liquid supply portion supplying a liquid to the blade, wherein the roller portion includes a first roller and a second roller rotating in directions opposite to each other, the first roller rotates about a third axis parallel to the first axis, the second roller rotates about a fourth axis parallel to the first axis, the first axis, the second axis, the third axis, and the fourth axis extend in an axial direction, at least a part of the blades of the tearing portion crosses a first virtual straight line as viewed in the axial direction, when tearing off the fiber-containing sheet in the second direction, the first virtual straight line couples a first middle point to a second middle point, the first middle point is positioned at a middle point between the first axis and the second axis and positioned on a second virtual straight line extending from the first axis to the second axis in a perpendicular direction perpendicular to the axial direction, and the second middle point is positioned at a middle point between the third axis and the fourth axis and positioned on a third virtual straight line extending from the third axis to the fourth axis in the perpendicular direction, and the tearing portion tears off the fiber-containing sheet when the fiber-containing sheet is pinched by the roller portion.

11. The coarse crushing device according to claim 10, wherein the tearing portion includes a roller provided with the blade on an outer surface thereof.

12. The coarse crushing device according to claim 10, wherein a distance between the two adjacent first rotary cutters is 6 mm or less, a distance between the two adjacent second rotary cutters is 6 mm or less, and a distance between the tearing portion and the roller portion is 26 mm or less.

13. The coarse crushing device according to claim 10, wherein the first liquid supply portion includes a roller in which the liquid is applied to an outer surface thereof.

14. The coarse crushing device according to claim 13, wherein a thickness of the liquid applied to the outer surface of the roller is 6% or more and 80% or less with respect to a thickness of a fiber-containing sheet.

15. The coarse crushing device according to claim 10, wherein a blade width of the first rotary cutter is 0.5 mm or more and 2.5 mm or less.

* * * * *